United States Patent
Crouch et al.

(10) Patent No.: US 10,670,720 B2
(45) Date of Patent: Jun. 2, 2020

(54) METHOD AND SYSTEM FOR USING SQUARE WAVE DIGITAL CHIRP SIGNAL FOR OPTICAL CHIRPED RANGE DETECTION

(71) Applicant: Blackmore Sensors & Analytics, LLC., Palo Alto, CA (US)

(72) Inventors: Stephen C. Crouch, Bozeman, MT (US); James Curry, Bozeman, MT (US); Trenton Berg, Manhattan, MT (US); Richard Funk, Bozeman, MT (US); Kyle Oliver, Bozeman, MT (US); Daniel Ferguson, Bozeman, MT (US)

(73) Assignee: BLACKMORE SENSORS & ANALYTICS, LLC, Palo Alto, CA (US)

( * ) Notice: Subject to any disclaimer, the term of this patent is extended or adjusted under 35 U.S.C. 154(b) by 0 days.

(21) Appl. No.: 16/719,010

(22) Filed: Dec. 18, 2019

(65) Prior Publication Data

US 2020/0124727 A1 Apr. 23, 2020

Related U.S. Application Data

(63) Continuation of application No. 15/661,377, filed on Jul. 27, 2017, now Pat. No. 10,534,084.

(51) Int. Cl.
*G01S 17/26* (2020.01)
*H04B 10/556* (2013.01)
(Continued)

(52) U.S. Cl.
CPC ............ *G01S 17/26* (2020.01); *G01S 7/4861* (2013.01); *H04B 10/40* (2013.01); *H04B 10/505* (2013.01);
(Continued)

(58) Field of Classification Search
CPC .................................................... G01S 7/4861
See application file for complete search history.

(56) References Cited

U.S. PATENT DOCUMENTS

| 4,099,249 A | 7/1978 | Casasent |
| 5,781,156 A | 7/1998 | Krasner |

(Continued)

FOREIGN PATENT DOCUMENTS

| CN | 105652282 | 6/2016 |
| WO | WO2007/124063 | 11/2007 |

(Continued)

OTHER PUBLICATIONS

Haralick, R.M., S.R. Sternberg and X. Zhuang, "Image Analysis Using Mathematical Morphology," IEEE Transactions on Pattern Analysis and Machine Intelligence, v. PAMI-9 (4), Jul. 1987.

(Continued)

*Primary Examiner* — Eric L Bolda
(74) *Attorney, Agent, or Firm* — Foley & Lardner LLP

(57) ABSTRACT

An apparatus is provided for using a square wave digital chirp signal for optical chirp range detection. A laser source emits an optical signal and a RF waveform generator generates an input digital chirp signal based on the square wave digital chirp signal. A frequency of the optical signal is modulated based on the input digital chirp signal. A splitter divides the optical signal into a transmit optical signal and a reference optical signal. A detector combines the reference optical signal and a return optical signal from an object. The detector generates an electrical output signal based on the combined reference optical signal and the return optical signal. A processor determines a range to the object based on a characteristic of a Fourier transform the electrical output signal. A method is also provided for using the square wave digital chirp signal for optical chirp range detection.

20 Claims, 13 Drawing Sheets

(51) Int. Cl.

| | |
|---|---|
| G01S 7/4861 | (2020.01) |
| H04B 10/50 | (2013.01) |
| H04B 10/40 | (2013.01) |
| H04L 27/26 | (2006.01) |
| H04L 25/03 | (2006.01) |

(52) U.S. Cl.
CPC ... *H04B 10/5561* (2013.01); *H04L 25/03343* (2013.01); *H04L 27/2627* (2013.01)

(56) References Cited

U.S. PATENT DOCUMENTS

| | | |
|---|---|---|
| 6,753,950 B2 | 6/2004 | Morcom |
| 6,931,055 B1 | 8/2005 | Underbrink et al. |
| 7,511,824 B2 | 3/2009 | Sebastian et al. |
| 7,742,152 B2 | 6/2010 | Hui et al. |
| 7,917,039 B1 | 3/2011 | Delfett |
| 8,531,650 B2 | 9/2013 | Feldkhun et al. |
| 8,805,197 B2 | 8/2014 | Delfett |
| 9,383,753 B1 | 7/2016 | Templeton et al. |
| 1,003,681 A1 | 7/2018 | Crouch et al. |
| 2002/0071109 A1 | 6/2002 | Allen et al. |
| 2004/0109155 A1 | 6/2004 | Deines |
| 2006/0239312 A1 | 10/2006 | Kewitsch et al. |
| 2008/0018881 A1 | 1/2008 | Hui |
| 2009/0002679 A1 | 1/2009 | Ruff et al. |
| 2009/0059201 A1 | 3/2009 | Willner |
| 2010/0183309 A1 | 7/2010 | Etemad et al. |
| 2010/0188504 A1 | 7/2010 | Dimsdale |
| 2011/0205523 A1 | 8/2011 | Pezk et al. |
| 2011/0292371 A1 | 12/2011 | Chang |
| 2012/0274922 A1 | 1/2012 | Hodge |
| 2012/0038902 A1 | 2/2012 | Dotson |
| 2015/0046119 A1 | 2/2015 | Sandhawalia et al. |
| 2015/0185244 A1 | 2/2015 | Kabushiki |
| 2015/0323660 A1 | 11/2015 | Hampikian |
| 2016/0091599 A1 | 3/2016 | Jenkins |
| 2016/0123720 A1 | 5/2016 | Thorpe et al. |
| 2016/0216366 A1 | 7/2016 | Phillips et al. |
| 2016/0377724 A1 | 12/2016 | Crouch et al. |
| 2017/0115393 A1* | 4/2017 | Nagai ................... G01S 7/4861 |
| 2017/0343652 A1 | 11/2017 | De Mersseman et al. |
| 2017/0350964 A1 | 12/2017 | Kaneda |
| 2018/0224547 A1 | 8/2018 | Crouch et al. |

FOREIGN PATENT DOCUMENTS

| | | |
|---|---|---|
| WO | WO2010/127151 | 11/2010 |
| WO | WO2018/10188 | 6/2018 |
| WO | WO2018/102190 | 6/2018 |
| WO | WO2018/125438 | 7/2018 |
| WO | WO2018/144853 | 9/2018 |
| WO | WO2018/160240 | 9/2018 |

OTHER PUBLICATIONS

Kachelmyer, A.L., "Range-Doppler Imaging with a Laser Radar," The Lincoln Laboratory Journal, 1990, pp. 1-32, vol. 3, Issue: 1.
Besl, P.J. and N.D. McKay, "Method for registration of 3-D shapes," 1992, vol. 1611, pp. 586-606.
Marron, J. C. and Schroeder, K. S., "Three-dimensional lensless imaging using laser frequency diversity," Appl. Opt. 31, 1992, pp. 255-262.
Johnson, Andrew, "Spin-Images: A Representation for 3-D Surface Matching," doctoral dissertation, tech. report CMU-RI-TR-97-47, Robotics Institute, Carnegie Mellon University, Aug. 1997.
Aull, B. F., et al., "Geiger-Mode avalanche photodiodes for three-dimensional imaging," Lincoln Lab. J., 2002, pp. 335-350, vol. 13.
Bashkansky, et al., M. "RF phase-coded random-modulation LIDAR," Optics Communications, 2004, pp. 93-98, vol. 231.
Garcia, J., et al., "Detection of Three Dimensional Objects Based on Phase Encoded Range Images," Sixth International Conference on Correlation Optics, Bellingham, WA 2004, pp. 269-280, vol. 5477.
Fundamentals of Direct Digital Synthesis, Analog Devices, MT-085 Tutorial Rev. D, Oct. 2008. pp. 1-9.
Fehr, D., A. Cherian, R. Sivalingam, S. Nickolay, V. Moreallas, and N. Papanikolopolous, "Compact Covariance descriptors in 3D point clouds for object recognition," presented at the Robotics and Automation (ICRA), 2012 IEEE International Conference, pp. 1793-1798.
Adany, P., et al., "Chirped Lidar Using Simplified Homodyne Detection," Jour. Lightwave Tech., Aug. 2009; pp. 1-7, vol. 27, Issue 16.
Klasing, K., D. Althoff, D. Wollher and M. Buss, "Comparison of Surface Normal Estimation Methods for Range Sensing Applications," in proceedings of the 2009 IEEE International Conference of Robotics and Automation, Piscataway, NJ, USA, 2009, p. 1977-1982.
Roos, P. A., et al., "Ultrabroadband optical chirp linearization for precision metrology applications," Opt. Lett. 34, 2009, pp. 3692-3694.
Rabb, D. J., et al., "Multi-transmitter aperture synthesis," Opt. Express 18, 2010, pp. 24937-24945.
O'Donnell, R.M., "Radar Systems Engineering Lecture 11 Waveforms and Pulse Compression," IEE New Hampshire Section, Jan. 1, 2010, pp. 1-58.
Cao, et al., "Lidar Signal Depolarization by Solid Targets and its application to terrain mapping and 3D imagery," Deference R&D, Contract Report DRDC Valcartier CR 2011-236 Mar. 2011 [retrieved on Jan. 11, 2018]. Retrieved from the Internet: <URL: http://publications.gc.ca/collections/collection_2016/rddc-drdc/D68-3-236-2011-eng.pdf> pp. 1-74.
Le, Trun G-Thanh., "Arbitrary Power Splitting Couplers Based on 3x3 Multimode Interference Structures for All-0ptical computing," IACSIT International Journal of Engineering and Technology. vol. 3, No. 5, Oct. 2011. pp. 565-569.
Tippie, A. E., et al., "High-resolution synthetic-aperture digital holography with digital phase and pupil correction," Optics Express 19, 2011, pp. 12027-12038, vol. 19, No. 13.
Crouch, S. and Barber, Z. W., "Laboratory demonstrations of interferometric and spotlight synthetic aperture ladar techniques," Opt. Express 20, 2012, pp. 24237-24246.
Krause, Brian W., et al., "Motion compensated frequency modulated continuous wave 3D coherent imaging ladar with scannerless architecture," Appl. Opt. v51, 2012, pp. 8745-8761.
Duncan, B. D. and Dierking, M. P., "Holographic aperture ladar: erratum," Appl. Opt. 52, 2013, pp. 706-708.
Contu, Francesco, "The Do's and Don'ts of High Speed Serial Design in FPGA's". Xilinix All Programmable, Copyright 2013, High Speed Digital Design & Validation Seminars 2013.
Dapore, B. R., et al., "Phase noise analysis of two wavelength coherent imaging system," Opt. Express 21, 2013, pp. 30642-30652.
Salehian, H., G. Cheng, B.C. Vemuri and J_ Ho, "Recursive Estimation of the Stein Center of SPD Matrices and Its applications," in 2013 IEEE International Conference on Computer Vision {ICCV), 2013, pp. 1793-1800.
Campbell, JF, et al. "Super-resolution technique for CW lidar using Fourier transform reordering and Richardson-Lucy deconvolution." Opt Lett. Dec. 15, 2014; 39(24): 6981-4.
Lu, et al. "Recognizing Objects in 3D Point Clouds with Multi-Scale Local Features," Sensors 2014, 14, 24156-24173; doi: 10.3390/s141224156, Dec. 15, 2014 [retrieved on Jan. 11, 2018].
Crouch, S., et al., "Three dimensional digital holographic aperture synthesis," Optics Express 23, pp. 23811-23816, 2015.
Optoplex Corporation. "90 degree Optical Hybrid". Nov. 9, 2016.
Foucras, M. et al., "Detailed analysis of the impact of the code Doppler on the acquisition performance of new GNSS signals, "ION ITM 2014, International Technical Meeting of the Institute of Navigation, San Diego, CA, Jan. 2014, pp. 1-13.
Stafford, J., et al., "Holographic aperture radar with range compression," Journal of Optical Society of America, 2017, pp. A1-A9, vol. 34, No. 5.
Beck, S.M., et al., "Synthetic-aperture imaging laser radar: laboratory demonstration and signal processing," Appl. Opt., 2005, pp. 7621-7629, vol. 44.

(56) References Cited

OTHER PUBLICATIONS

J. Ye., "Least Squares Linear Discriminant Analysis", Proceedings of the 24th International Conference on Machine Learning, p. 1087-1093 (as of Nov. 27, 2016).
Berkovic, G. and Shafir E., "Optical methods for distance and displacement measurements," Adv. Opt. Photon. 4, 2012, pp. 441-471.
Munkres, J., "Algorithms for the assignment and transportation problems," Journal of the Society for Industrial and Applied Mathematics, v5 (1), pp. 32-38, Mar. 1957.
Satyan, N., et al., "Precise control of broadband frequency chirps using optoelectronic feedback," Opt. Express 17, 2009, pp. 15991-15999.
OIF (optical internetworking forum), "implementation agreement for integrated dual polarization micro-intradyne coherent receivers," R. Griggs, Ed., IA #OIF-DPC-MRX-01.0, published by optical internetworking forum available at domain oiforum at category com, Mar. 31, 2015.
Wikipedia, In-phase and quadrature components, https://en.wikipedia.org/wiki/in-phase_and_quadrature_components (as of Jan. 26, 2018).
Wikipedia, Field-programmable gate array, https:en.wikipedia.org/wiki/field-programmable_gate_array (as of Apr. 15, 2017).
Wikipedia, Phase-shift keying, https:en.wikipedia.org/wiki/phase-shift_keying#binary_phase-shift_keying.25bpsk.29 (as of Oct. 23, 2016).
Wikipedia, Digital-to-analog converter, https://en.wikipedia.org/wiki/digital-to-analog_converter (as of Apr. 15, 2017).
Duncan, B. D. and Dierking, M. P., Holographic aperture ladar: Appl. Opt. vol. 48, issue 6, pp. 1-10 (2009.
International Search Report and Written Opinion for correspondence PCT Application PCT/US17/062721, dated Feb. 6, 2018, pp. 1-12.
International Search Report and Written Opinion for correspondence PCT Application PCT/US17/062714, dated Aug. 23, 2018, pp. 1-13.
International Search Report and Written Opinion for correspondence PCT Application PCT/US17/062708, dated Mar. 16, 2018, pp. 1-14.
International Search Report and Written Opinion for correspondence PCT Application PCT/US17/062703, dated Aug. 27, 2018, pp. 1-13.
International Search Report and Written Opinion for correspondence PCT Application PCT/US18/44007, dated Oct. 25, 2018, pp. 1-11.
International Search Report and Written Opinion for correspondence PCT Application PCT/US18/41388, dated Sep. 20, 2018, pp. 1-13.
International Search Report and Written Opinion for correspondence PCT Application PCT/US18/16632, dated Apr. 24, 2018, pp. 1-6.

\* cited by examiner

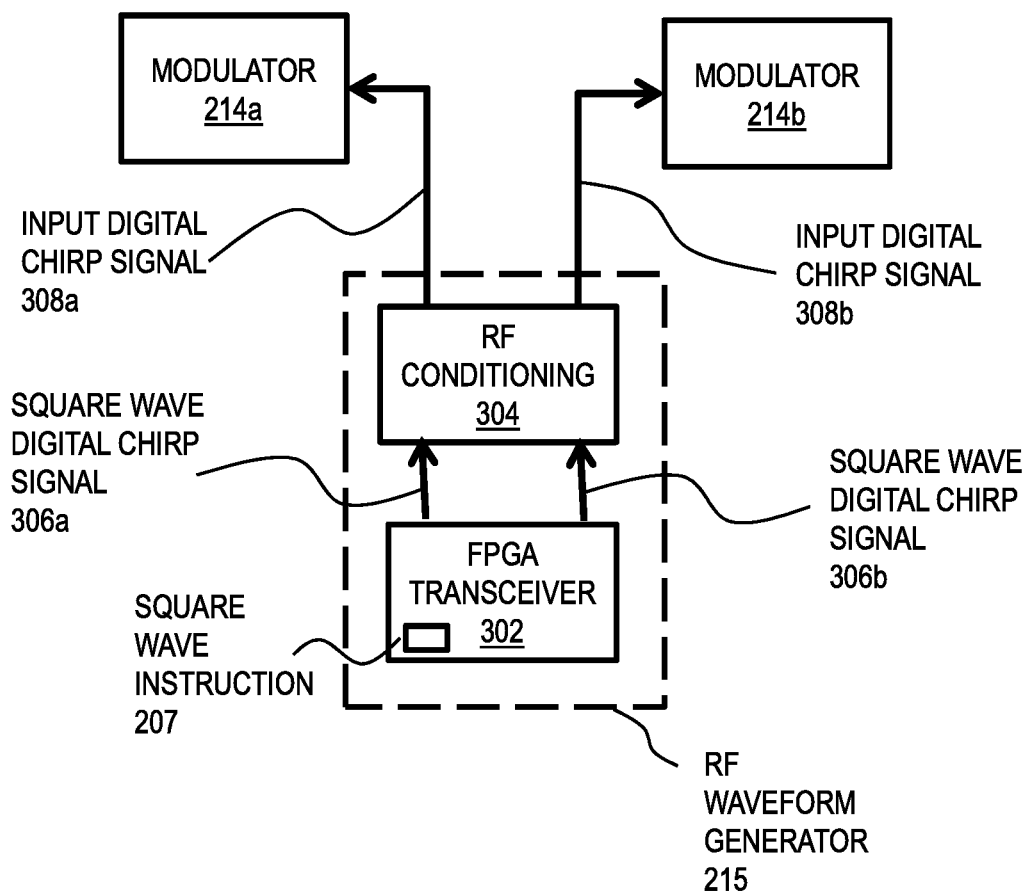

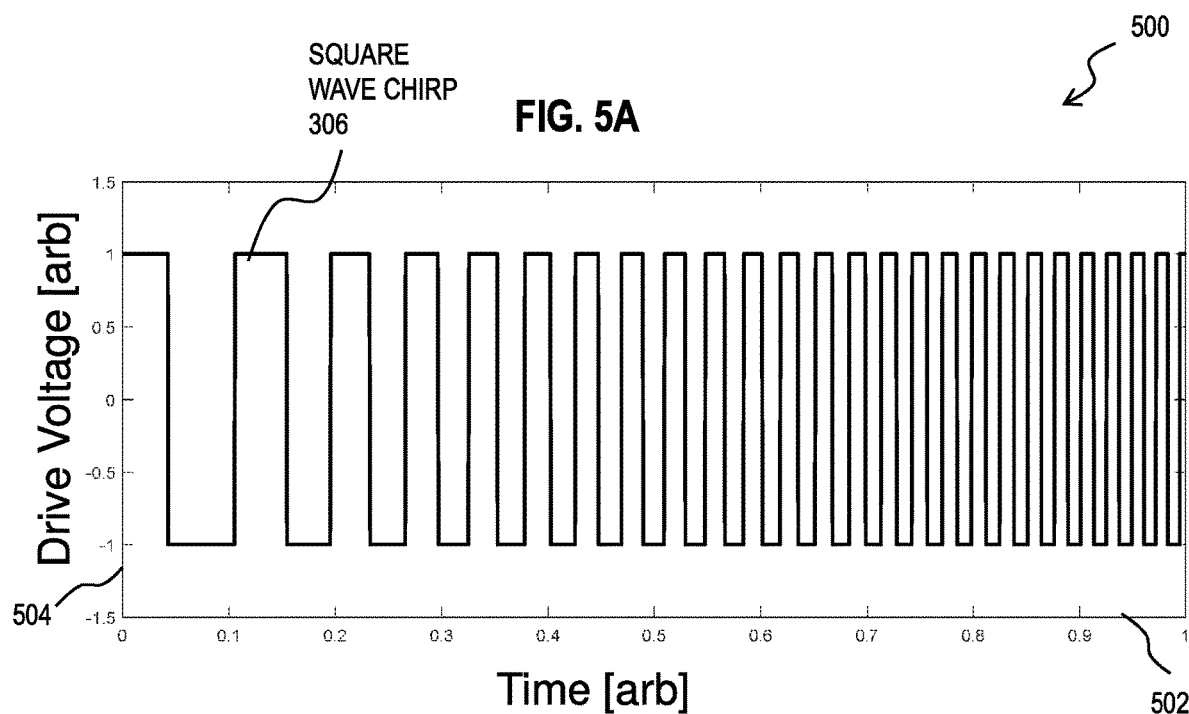
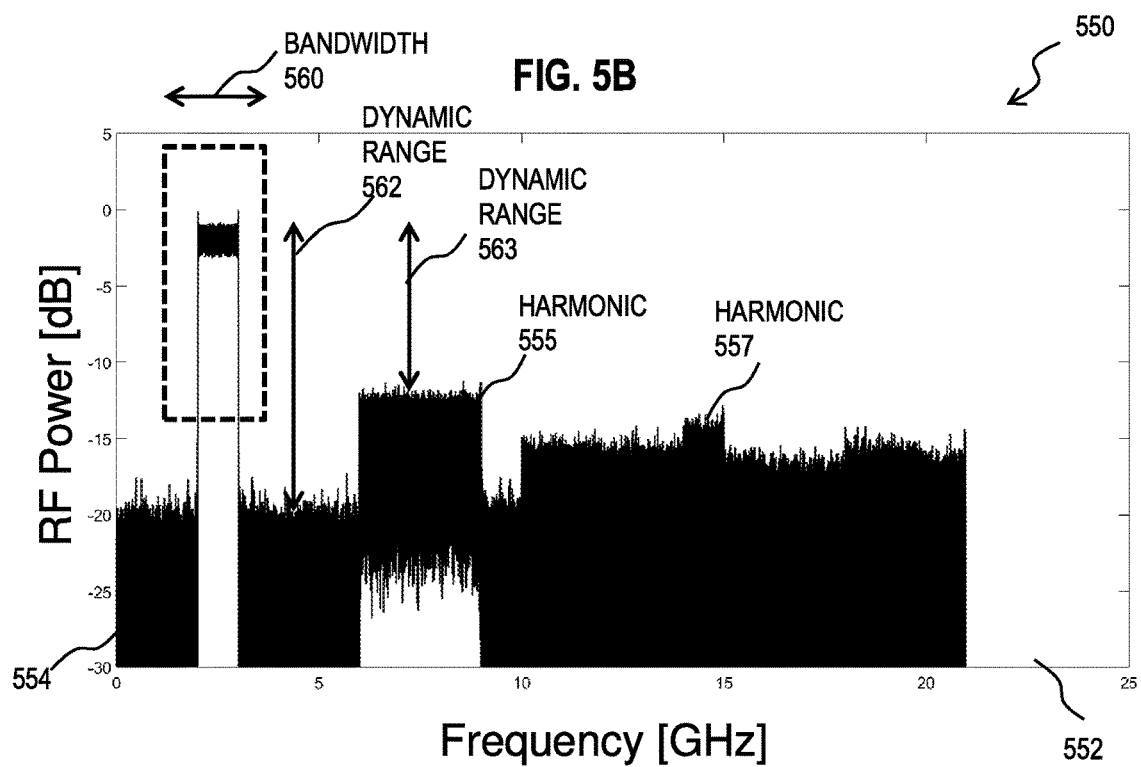

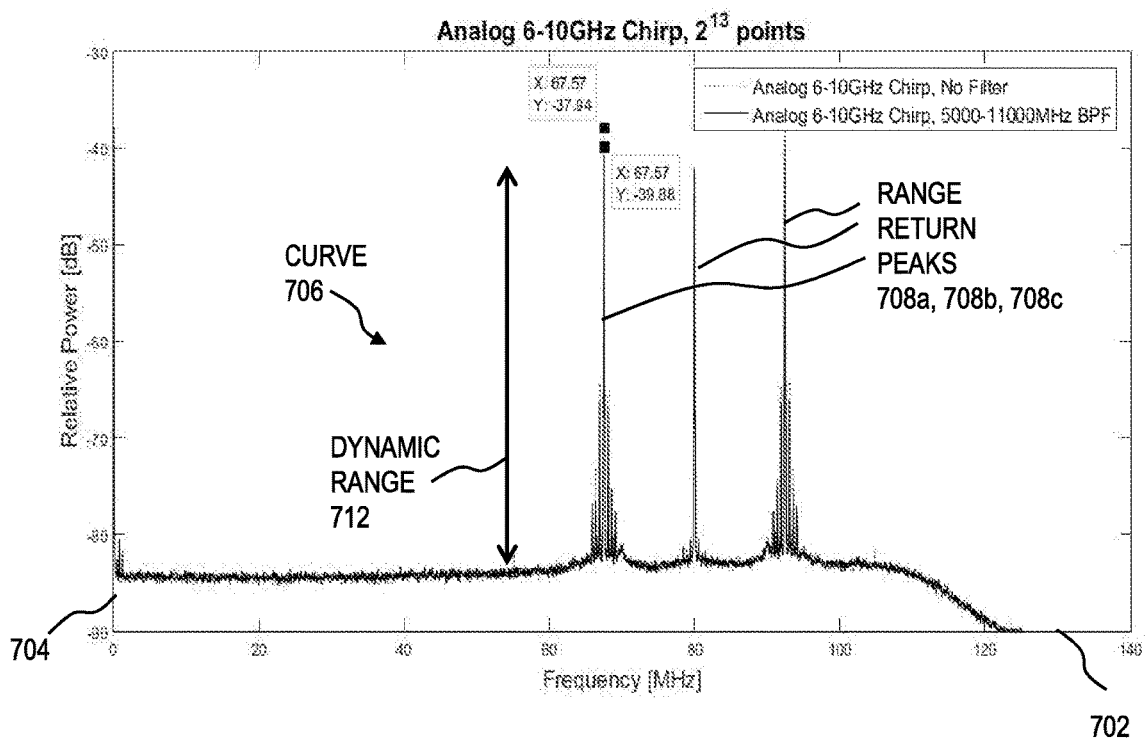
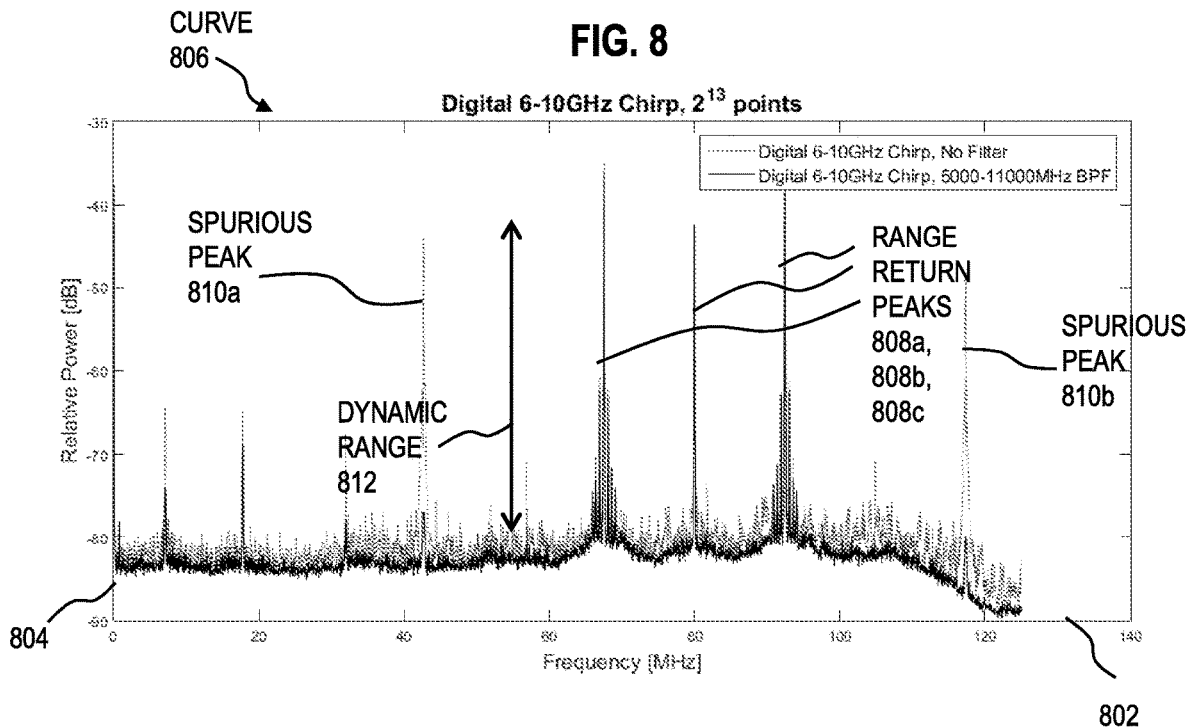

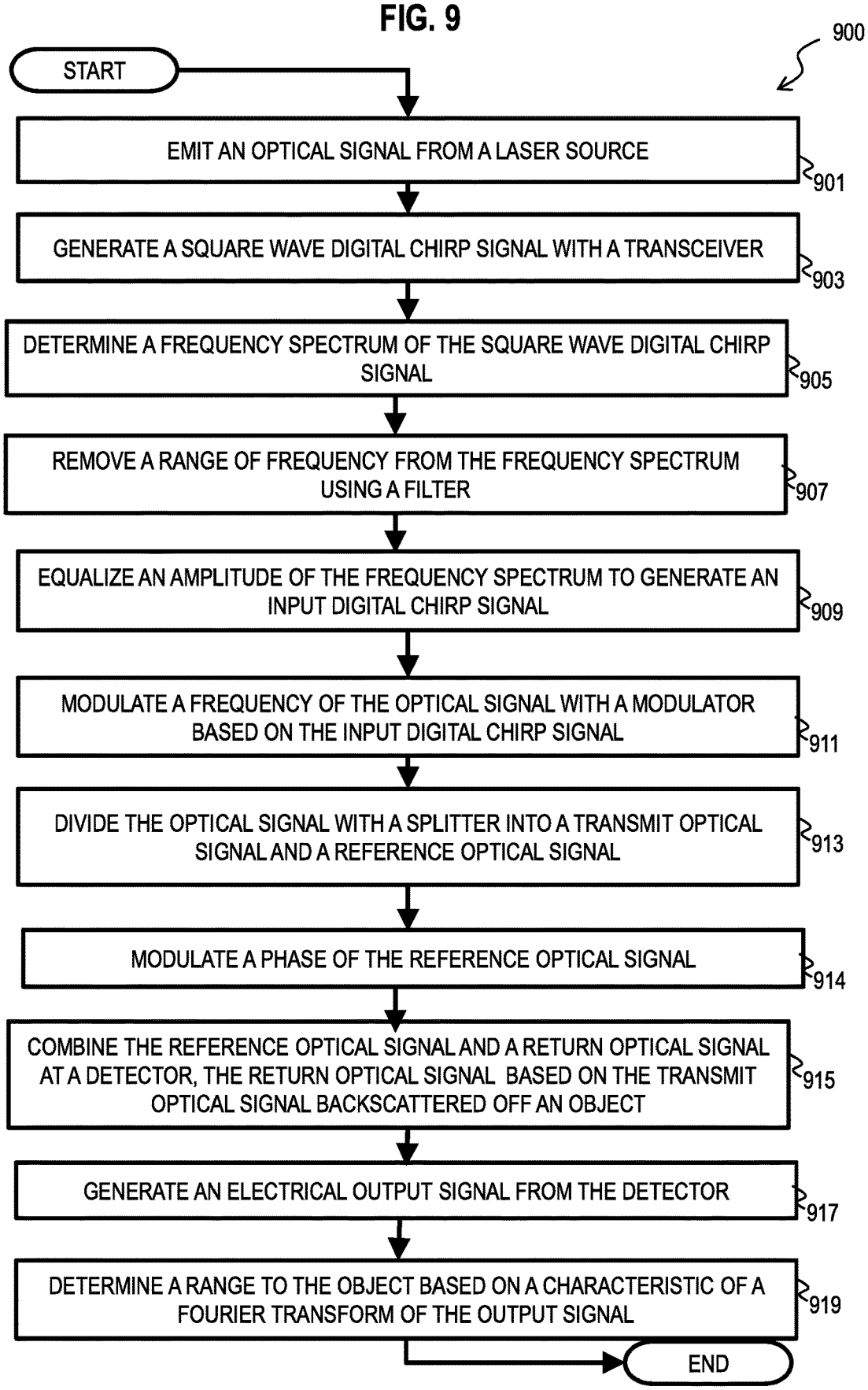

METHOD AND SYSTEM FOR USING SQUARE WAVE DIGITAL CHIRP SIGNAL FOR OPTICAL CHIRPED RANGE DETECTION

CROSS-REFERENCE TO RELATED APPLICATIONS

The present application is a Continuation of U.S. patent application Ser. No. 15/661,377, filed Jul. 27, 2017, the disclosure of which is incorporated herein by reference in its entirety.

BACKGROUND

Optical detection of range, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to a target, and chirped detection based on a frequency difference between a transmitted chirped optical signal and a returned signal scattered from a target.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped LIDAR systems use long optical pulses with relatively low peak optical power. In this configuration, the range accuracy depends on the chirp bandwidth rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency that is proportional to the difference in frequencies between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152, the entire contents of which are hereby incorporated by reference as if fully set forth herein, except for terminology that is inconsistent with the terminology used herein, show a novel simpler arrangement of optical components that uses, as the reference optical signal, an optical signal split from the transmitted optical signal. This arrangement is called homodyne detection in that patent.

SUMMARY

In conventional chirped LIDAR systems, an RF source is provided to generate the RF electrical signal at a bandwidth (e.g. 500 Megahertz, MHz, 1 MHz=$10^6$ Hertz, to 10 Gigahertz,\GHz, 1 GHz=$10^9$ Hz) to modulate the optical carrier. The current inventors have recognized that RF electrical signals generated by conventional RF sources have notable drawbacks. For example, the bandwidth of RF electrical signals generated by Digital Analog Converters (DAC) or Direct Digital Synthesis (DDS) devices typically max out at about 4 GHz, which limits range accuracy of the LIDAR system. Additionally, DAC or DDS devices are bulky, so as to consume valuable space in packages of limited size and weight, and expensive (e.g. $200K). Furthermore, although the bandwidth of RF electrical signals generated by the DAS or DDS devices can be increased to about 10 GHz, this involves additional steps (e.g. RF multiplying, optical multiplying) that require high power and introduces unwanted characteristics to the signal. An apparatus and method is provided that addresses the drawbacks of conventional RF signals provided by conventional RF sources in chirped LIDAR systems. This apparatus and method involves digitized chirp generation using a Field Programmable Gate Array (FPGA) transceiver in a chirped LIDAR system.

In a first set of embodiments, an apparatus is provided for using a square wave digital chirp signal for optical chirp range detection. The apparatus includes a laser source for emitting an optical signal. The apparatus also includes a RF waveform generator for generating an input digital chirp signal that is based on the square wave digital chirp signal. The apparatus also includes a modulator for modulating a frequency of the optical signal based on the input digital chirp signal. Additionally, the apparatus includes a splitter to divide the optical signal into a transmit optical signal and a reference optical signal. The apparatus further includes a detector to combine the reference optical signal and a return optical signal based on the transmit optical signal backscattered off an object. The detector is configured to generate an electrical output signal based on the combined reference optical signal and the return optical signal. The apparatus further includes a processor to determine a range to the object based on a characteristic of a Fourier transform the electrical output signal.

In a second set of embodiments, a method is provided for using a square wave digital chirp signal for optical chirp range detection. The method includes emitting an optical signal from a laser source and modulating a frequency of the optical signal with a modulator based on an input digital chirp signal from a RF waveform generator. The input digital chirp signal is based on the square wave digital chirp signal. Additionally, the method includes dividing the optical signal with a splitter into a transmit optical signal and a reference optical signal. The method further includes combining the reference optical signal and a return optical signal at a detector. The return optical signal is based on the transmit optical signal backscattered off an object. Additionally, the method includes generating an electrical output signal from the detector based on the combining step. The method further includes determining a range to the object with a processor based on a characteristic of a Fourier transform the output electrical output signal.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3C is a block diagram that illustrates example components of the RF waveform generator of the LIDAR system of FIG. 2B, according to an embodiment;

FIG. 5A is a graph that illustrates an example of a square wave digital chirp signal used in the LIDAR systems of FIG. 2A and FIG. 2B, according to an embodiment;

FIG. 5B is a graph that illustrates an example of a frequency spectrum of the square wave digital chirp signal of FIG. 5A, according to an embodiment;

FIG. 7 is a graph that illustrates an example measurement of a beat frequency resulting from de-chirping in a conventional LIDAR system using the input digital chirp signal of FIG. 4A, according to an embodiment;

FIG. 8 is a graph that illustrates an example measurement of a beat frequency resulting from de-chirping in a LIDAR system using the square wave digital chirp signal of FIG. 5A, according to an embodiment;

FIG. 9 is a flow chart that illustrates an example method for using a square wave digital chirp signal for optical chirped range detection, according to an embodiment;

DETAILED DESCRIPTION

A method and apparatus and system and computer-readable medium are described for using a square wave digital chirp signal for optical chirped range detection. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of using a wideband RF electrical signal to modulate one or more optical carriers in a chirped LIDAR system. However, the invention is not limited to this context. In other embodiments, the invention could be used in the context of using a wideband waveform generator to produce waveforms useful for: ranging, including phase codes for phase shift keying, on-off keying, frequency shift keying or broadband noise.

1. Chirped Detection Overview

Figure 1A:
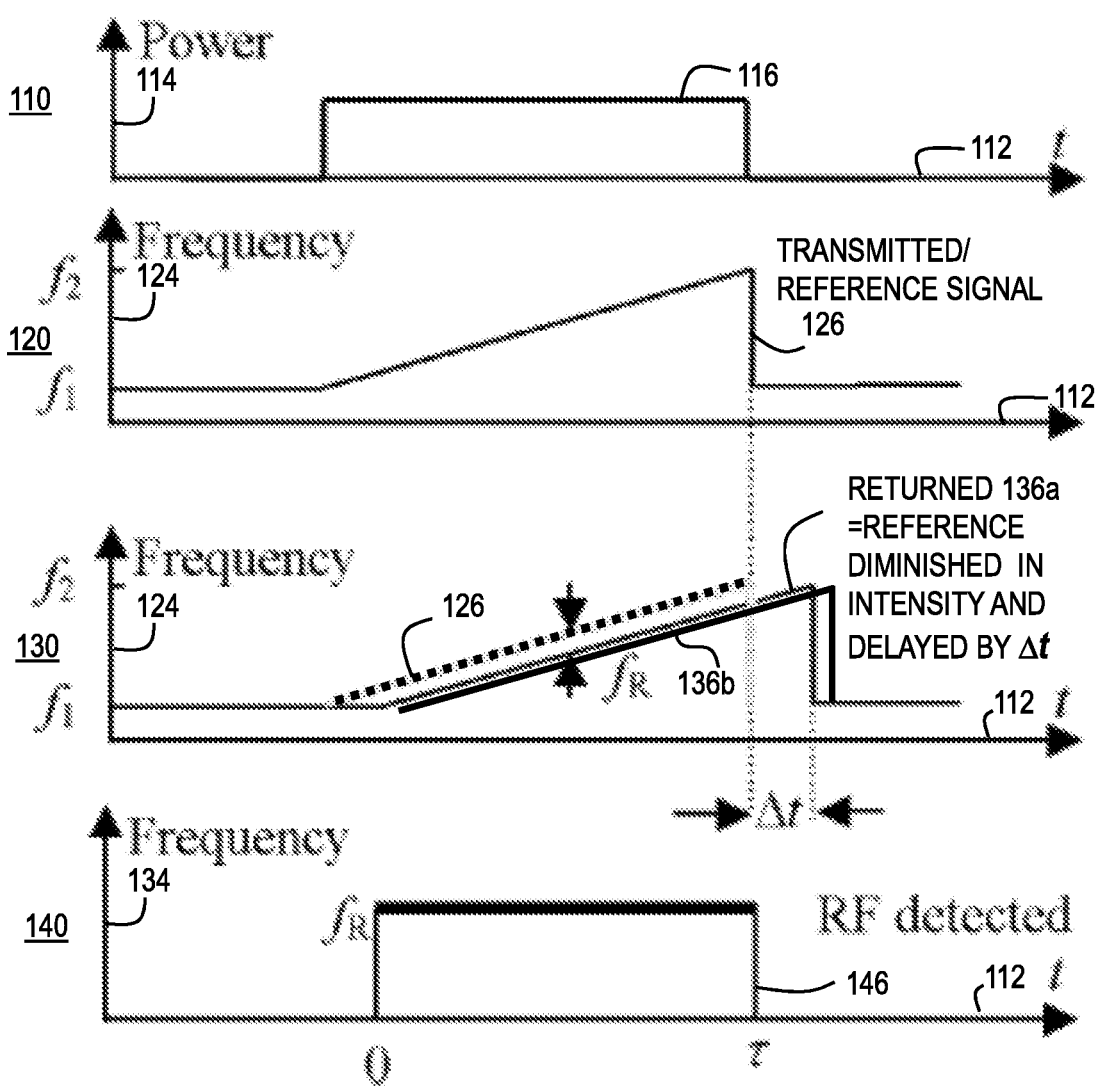
FIG. 1A is a set of graphs that illustrates an example optical chirp measurement of range, according to an embodiment.

FIG. 1A is a set of graphs 110, 120, 130, 140 that illustrates an example optical chirp measurement of range, according to an embodiment. The horizontal axis 112 is the same for all four graphs and indicates time in arbitrary units, on the order of milliseconds (ms, 1 ms=$10^{-3}$ seconds). Graph 110 indicates the power of a beam of light used as a transmitted optical signal. The vertical axis 114 in graph 110 indicates power of the transmitted signal in arbitrary units. Trace 116 indicates that the power is on for a limited pulse duration, τ starting at time 0. Graph 120 indicates the frequency of the transmitted signal. The vertical axis 124 indicates the frequency transmitted in arbitrary units. The trace 126 indicates that the frequency of the pulse increases from $f_1$ to $f_2$ over the duration τ of the pulse, and thus has a bandwidth B=$f_2$-$f_1$. The frequency rate of change is ($f_2$-$f_1$)/τ.

The returned signal is depicted in graph 130 which has a horizontal axis 112 that indicates time and a vertical axis 124 that indicates frequency as in graph 120. The chirp 126 of graph 120 is also plotted as a dotted line on graph 130. A first returned signal is given by trace 136a, which is just the transmitted reference signal diminished in intensity (not shown) and delayed by Δt. When the returned signal is received from an external object after covering a distance of 2R, where R is the range to the target, the returned signal start at the delayed time Δt is given by 2R/c, were c is the speed of light in the medium (approximately 3×10^8 meters per second, m/s). Over this time, the frequency has changed by an amount that depends on the range, called $f_R$, and given by the frequency rate of change multiplied by the delay time. This is given by Equation 1a.

$$f_R = (f_2 - f_1)/\tau * 2R/c = 2BR/c\tau \quad (1a)$$

The value of $f_R$ is measured by the frequency difference between the transmitted signal 126 and returned signal 136a in a time domain mixing operation referred to as de-chirping. So the range R is given by Equation 1b.

$$R = f_R c\tau / 2B \quad (1b)$$

Of course, if the returned signal arrives after the pulse is completely transmitted, that is, if 2R/c is greater than τ, then Equations 1a and 1b are not valid. In this case, the reference signal is delayed a known or fixed amount to ensure the returned signal overlaps the reference signal. The fixed or known delay time of the reference signal is multiplied by the speed of light, c, to give an additional range that is added to range computed from Equation 1b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 130 by trace 136b. This will have a different measured value of $f_R$ that gives a different range using Equation 1b. In some circumstances, multiple returned signals are received.

Graph 140 depicts the difference frequency $f_R$ between a first returned signal 136a and the reference chirp 126. The horizontal axis 112 indicates time as in all the other aligned graphs in FIG. 1A, and the vertical axis 134 indicates frequency difference on a much expanded scale. Trace 146 depicts the constant frequency $f_R$ measured during the transmitted chirp, which indicates a particular range as given by Equation 1b. The second returned signal 136b, if present, would give rise to a different, larger value of $f_R$ (not shown) during de-chirping; and, as a consequence, yield a larger range using Equation 1b.

A common method for de-chirping is to direct both the reference optical signal and the returned optical signal to the same optical detector. The electrical output signal of the detector is dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=10^6 Hertz=10^6 cycles per second) rather than in the optical frequency range of Terahertz (THz, 1 THz=10^12 Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990, the entire contents of which are hereby incorporated by reference as if fully set forth herein, except for terminology inconsistent with that used herein. The disadvantage is that the digitizer bandwidth requirement is generally higher. The positive aspects of coherent detection are otherwise retained.

Figure 1B:
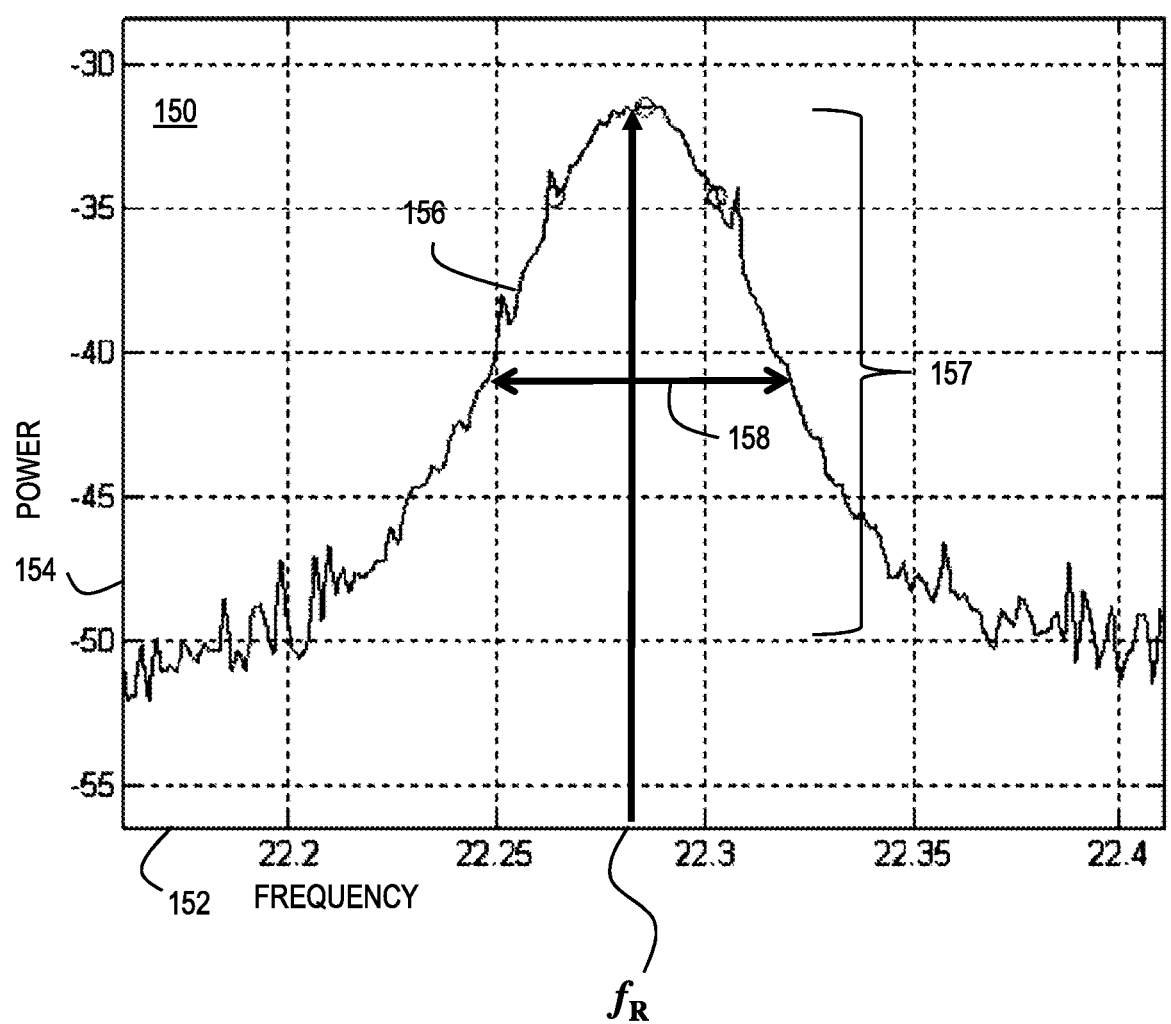
FIG. 1B is a graph that illustrates an example measurement of a beat frequency resulting from de-chirping, which indicates range, according to an embodiment.

FIG. 1B is a graph that illustrates an example measurement of a beat frequency resulting from de-chirping, which indicates range, according to an embodiment. The horizontal axis 152 indicates frequency in Megahertz; and the vertical axis indicates returned signal power density $I_R$ relative to transmitted power density $I_T$ in decibels (dB, Power in dB=20 $\log(I_R/I_T)$). Trace 156 is the Fourier transform of the electrical output signal by the optical detector, such as produced by a FFT circuit and is based on data published by Adany et al., 2009. The horizontal location of the peak gives $f_R$ and is used to estimate the range, using Equation 1b. In addition, other characteristics of the peak can be used to describe the returned signal. For example, the power value at the peak is characterized by the maximum value of trace 156, or, more usually, by the difference 157 (about 19 dB in FIG. 1B) between the peak value (about −31 dB in FIG. 1B) and a noise floor (about −50 dB in FIG. 1B) at the shoulders of the peak; and, the width of the peak is characterized by the frequency width 158 (about 0.08 MHz in FIG. 1B) at half maximum (FWHM). If there are multiple discernable returns, there will be multiple peaks in the FFT of the electrical output of the optical detector, likely with multiple different power levels and widths. Any method may be used to automatically identify peaks in traces, and characterize those peaks by location, height and width. For example, in some embodiments, FFTW or peak detection by MAT-LAB—Signal Processing Toolbox is used, available from MATLAB™ of MATHWORKS™ of Natick, Mass. One can also use custom implementations that rely on FFTW in CUDA and custom peak detection in CUDA™ available from NVIDIA™ of Santa Clara, Calif. Custom implementations have been programmed on field programmable gate arrays (FPGAs). A commonly used algorithm is to threshold the range profile and run a center of mass algorithm, peak fitting algorithm (3-point Gaussian fit), or nonlinear fit of the peak for some function (such as a Gaussian) to determine the location of the peak more precisely.

If the object detected (the source) is moving at velocity $v_s$ and the LIDAR system (the observer) is moving at velocity $v_o$ on the vector connecting the two, then the returned signal may be Doppler shifted and the beat frequency detected $f_R$ is also shifted, which can lead to errors in the detected range. In many circumstances, a shape of the object being detected is identified based on the relative location of multiple returns. Thus the shape of the object may be in error and the ability to identify the object may be compromised.

The observed frequency f' of the return differs from the correct frequency f of the return by the Doppler effect and is approximated by Equation 2a.

$$f' = \frac{(c + v_o)}{(c + v_s)} f \quad (2a)$$

Where c is the speed of light in the medium. Note that the two frequencies are the same if the observer and source are moving at the same speed in the same direction on the vector between the two. The difference between the two frequencies, $\Delta f = f' - f$, is the Doppler shift, D, which, if uncorrected, constitutes an error in the range measurement, and is given by Equation 2b.

$$D = \left[\frac{(c + v_o)}{(c + v_s)} - 1\right] f \qquad (2b)$$

Note that the magnitude of the error increases with the frequency f of the signal. Note also that for a stationary LIDAR system ($v_s=0$), for a target moving at 10 meters per second ($v_o=10$), and visible light of frequency about 500 THz, then the size of the error is on the order of 16 MHz which is 75% of the size of $f_R$, which is about 22 MHz in FIG. 1B, leading to a 75% error in $f_R$ and thus a 75% error in range. In various embodiments, the Doppler shift error is detected and used to correct the range.

2. Chirped Detection Hardware Overview

Figure 2A:
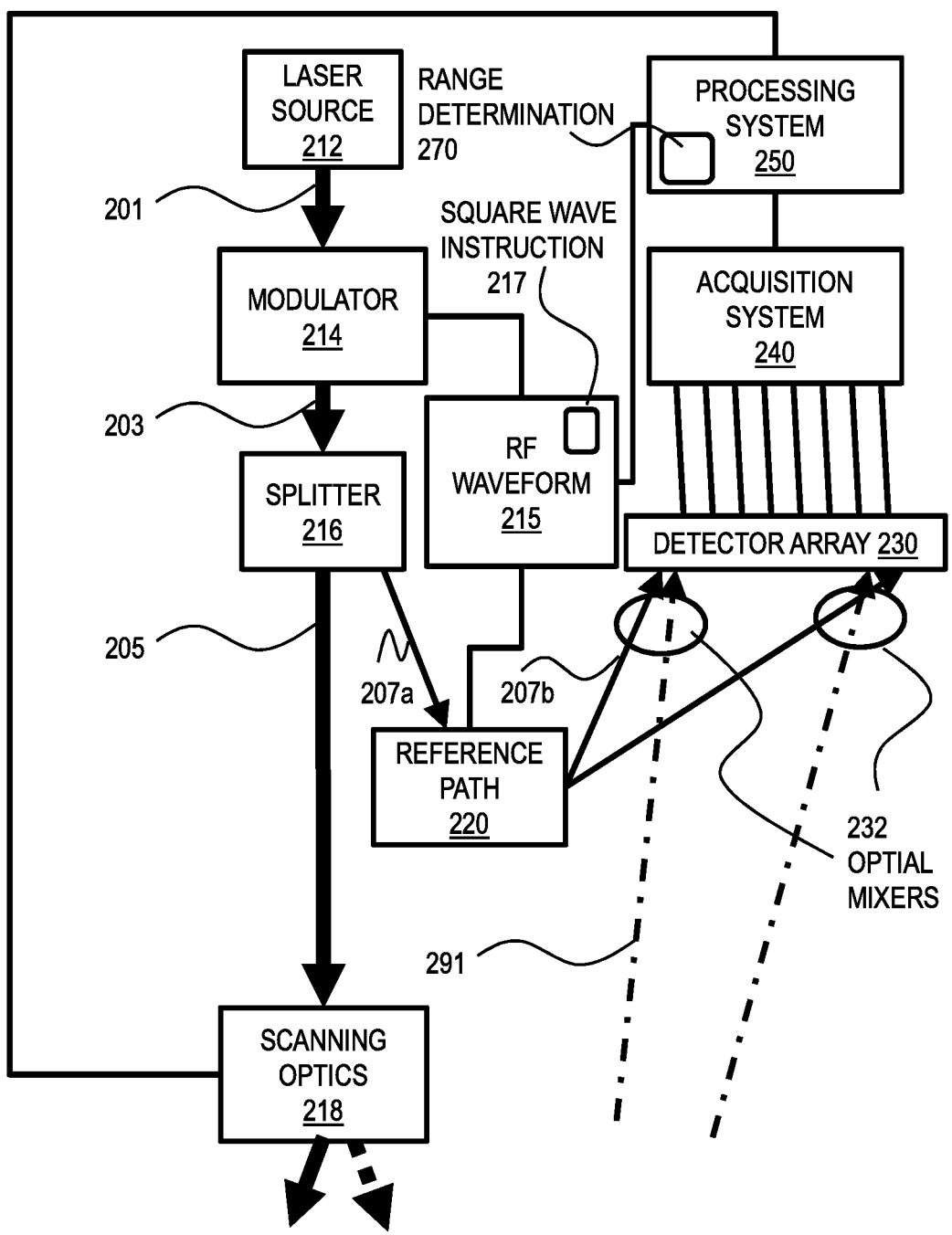
FIG. 2A and FIG. 2B are block diagrams that illustrate example components of a high resolution LIDAR system, according to various embodiments.
Figure 2B:
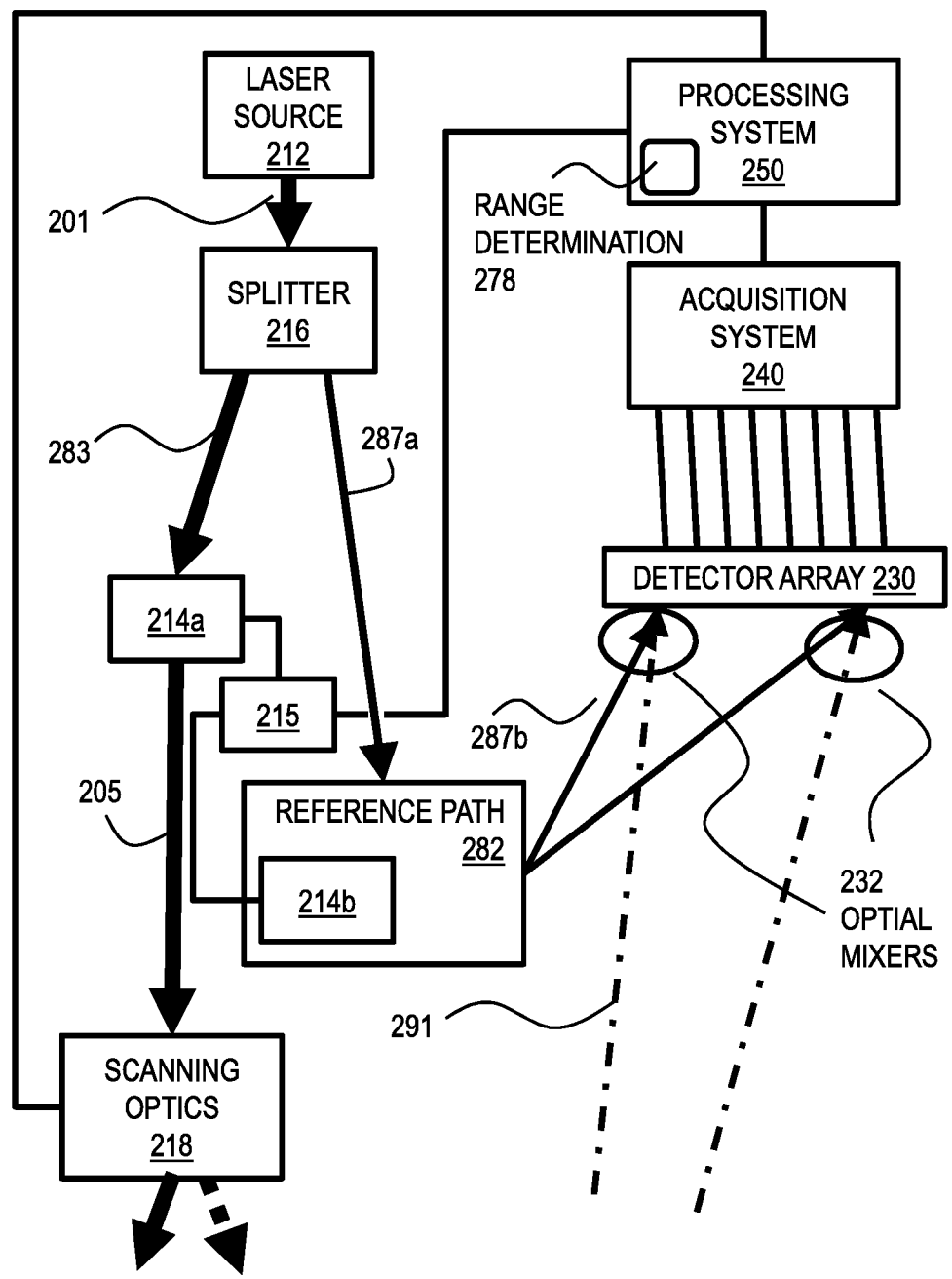

In order to depict how the chirped detection approach is implemented, some generic and specific hardware approaches are described. FIG. 2A and FIG. 2B are block diagrams that illustrate example components of a high resolution LIDAR system, according to various embodiments. In FIG. 2A, a laser source 212 emits a carrier wave 201 that is frequency modulated in the modulator 214 based on input from a RF waveform generator 215 to produce a pulse that has a bandwidth B and a duration τ. In various embodiments described in more detail in a later section, the electrical input from the RF waveform generator 215 is an input digital chirp signal that is based on a square wave digital chirp signal. In one embodiment, the square wave digital chirp signal is generated by the RF waveform generator 215 and further conditioned by the RF waveform generator 215, resulting in the input digital chirp signal. In some of these embodiments, the input digital chirp signal is the square wave digital chirp signal itself, without such conditioning. In some embodiments, the square wave digital chirp signal is generated by the RF waveform generator 215 based on a square wave instruction 217 uploaded into a memory of the RF waveform generator 215. In other embodiments, the range determination module 270 of the processing system 250 controls the RF waveform generator 215, including generation of the square wave digital chirp signal. In an example embodiment, the square wave instruction is provided in the range determination module 270.

A splitter 216 splits the modulated optical waveform into a transmitted signal 205 with most of the energy of the beam 203 and a reference signal 207 with a much smaller amount of energy that is nonetheless enough to produce good heterodyne or homodyne interference with the returned light 291 scattered from a target (not shown). In some embodiments, the transmitted beam is scanned over multiple angles to profile any object in its path using scanning optics 218.

The reference beam is delayed in a reference path 220 sufficiently to arrive at the detector array 230 with the scattered light. In some embodiments, the splitter 216 is upstream of the modulator 214, and the reference beam 207 is unmodulated. In some embodiments, the reference signal is independently generated using a new laser (not shown) and separately modulated using a separate modulator (not shown) in the reference path 220 and the input digital chirp signal from generator 215. In some embodiments, as described below with reference to FIG. 2B, a different modulator is used; but, only one laser source 212 is used for both transmitted and reference signals to ensure coherence. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination. In some embodiments, the target is close enough and the pulse duration long enough that the returns sufficiently overlap the reference signal without a delay. In some embodiments, the reference signal 207b is optically mixed with the return signal 291 at one or more optical mixers 232.

In some embodiments, the reference path 220 includes a phase modulator that receives an input digital chirp signal from the RF waveform generator 215, where the input digital chirp signal is based on a square wave digital chirp signal. In these embodiments, the input digital chirp signal received at the reference path 220 is independent of the input digital chirp signal received at the modulator 214. In an embodiment, a phase of the reference signal 207 is modulated by the phase modulator based on the input digital chirp signal, to advantageously reduce intensity noise variations between the reference beam 207b and return signal 291 at the optical mixers 232.

In various embodiments, multiple portions of the target scatter a respective returned light beam 291 back to the detector array 230 for each scanned beam resulting in a point cloud based on the multiple ranges of the respective multiple portions of the target illuminated by multiple beams and multiple returns. The detector array is a single or balanced pair optical detector or a 1D or 2D array of such optical detectors arranged in a plane roughly perpendicular to returned beams 291 from the target. The phase or amplitude of the interface pattern, or some combination, is recorded by acquisition system 240 for each detector at multiple times during the pulse duration τ. The number of temporal samples per pulse duration affects the down-range extent. The number is often a practical consideration chosen based on pulse repetition rate and available camera frame rate. The frame rate is the sampling bandwidth, often called "digitizer frequency." Basically, if X number of detector array frames are collected during a pulse with resolution bins of Y range width, then a X*Y range extent can be observed. The acquired data is made available to a processing system 250, such as a computer system described below with reference to FIG. 10, or a chip set described below with reference to FIG. 11. In some embodiments, the acquired data is a point cloud based on the multiple ranges of the respective multiple portions of the target.

A range determination module 270 calculates a range to the target based on an electrical output signal from the detector array 230. In some embodiments, the range determination module 270 performs a Fourier transform of the electrical output signal to obtain a frequency spectrum of the output signal and calculates the range to the target based on one or more characteristics of the frequency spectrum. In one embodiment, the range determination module 270 calculates the range based on one or more characteristics (e.g. frequency value or $f_R$) of the peak of the frequency spectrum of the electrical output signal depicted in FIG. 1B. In this embodiment, the range determination module 270 calculates the range using equation (1b) and the characteristic (e.g. $f_R$) of the peak of the frequency spectrum of the output signal from the detector array 230. The range determination module 270 calculates multiple ranges using equation (1b), where multiple peaks (e.g. multiple values of $f_R$) are present in the frequency spectrum of the output signal from the detector array 230.

In other embodiments, the module 270 is a Doppler compensation module that determines the size of a Doppler shift and a corrected range thereon. The Doppler compensation module is discussed in U.S. Provisional Application No. 62/428,109 filed on 30 Nov. 2016, which is incorporated by reference herein.

FIG. 2B depicts an alternative hardware arrangement that allows an input digital chirp signal based on a square wave digital chirp signal to be introduced from the RF waveform generator 215 into the reference path that produces the LO signal. In some embodiments, the input digital chirp signal introduced into the reference path is independent from the input digital chirp signal introduced into the transmit path. The laser source 212, splitter 216, transmit signal 205, scanning optics 218, optical mixers 232, detector array 230, acquisition system 240 and processing system 250 are as described above with reference to FIG. 2A. In FIG. 2B, there are two separate optical modulators, 214a in the transmit path and 214b in the reference path 282 to impose the input digital chirp from generator 215 onto an optical carrier.

The splitter 216 is moved between the laser source 212 and the modulators 214a and 214b to produce optical signal 283 that impinges on modulator 214a and lower amplitude reference path signal 287a that impinges on modulator 214b in a revised reference path 282. In this embodiment, the light 201 is split into a transmit (TX) path beam 283 and reference/local oscillator (LO) path beam 287a before the modulation occurs; and, separate modulators are used in each path. With the dual modulator approach, either path can be programmed with input digital chirp signals at offset starting frequencies and/or offset starting times and/or offset starting phases. By shifting the delay used in each range gate, the system can unambiguously measure with high resolution despite other systems limitations (detector and digitizer bandwidth, measurement time, etc.). The software controlled delay reference signal 287b is then mixed with the return signals 291, as described above. In other embodiments, the software controlled delay of the LO reference path 282 allows an adaptive scanning approach to be adaptive in the down-range dimension as well.

In some embodiments, the RF waveform generator 215 includes a pair of channels, where a first channel outputs a first input digital chirp signal to the modulator 214a and a second channel outputs a second input digital chirp signal to the modulator 214b. In some embodiments, the first input digital chirp signal is based on a first square wave digital chirp signal and the second input digital chirp signal is based on a second square wave digital chirp signal.

In one embodiment, the modulator 214a is a frequency modulator that receives the first input digital chirp signal to modulate a frequency of the transmit beam 283 and produce the transmitted signal 205 pulse that has a bandwidth B and a duration τ. In another embodiment, the modulator 214b is a phase modulator that receives the second input digital chirp signal from the RF waveform generator 215. In these embodiments, the first input digital chirp signal received at the modulator 214a is independent of the second input digital chirp signal received at the modulator 214b. In an embodiment, a phase of the reference signal 207 is modulated by the phase modulator based on the second input digital chirp signal, to advantageously reduce intensity noise variations between the reference beam 207b and return signal 291 at the optical mixers 232.

In some embodiments, the laser used was actively linearized with the modulation applied to the current driving the laser. Experiments were also performed with electro-optic modulators providing the modulation. The system is configured to produce a chirp of bandwidth B and duration τ, suitable for the down-range resolution desired, as described in more detail below for various embodiments. For example, in some illustrated embodiments, a value for B of about 90 GHz and τ of about 200 milliseconds (ms, 1 ms=$10^{-3}$ seconds) were chosen to work within the confines of the relatively low detector array frame rate in the experiments performed. These choices were made to observe a reasonably large range window of about 30 cm, which is often important in determining a shape of an object and identification of the object. This technique will work for chirp bandwidths from 10 MHz to 5 THz. However, for the 3D imaging applications, typical ranges are chirp bandwidths from about 300 MHz to about 20 GHz, chirp durations from about 250 nanoseconds (ns, ns=$10^{-9}$ seconds) to about 1 millisecond (ms, 1 ms=$10^{-3}$ seconds), ranges to targets from about 0 meters to about 20 km, spot sizes at target from about 3 millimeters (mm, 1 mm=$10^{-3}$ meters) to about 1 meter (m), depth resolutions at target from about 7.5 mm to about 0.5 m. It is noted that the range window can be made to extend to several kilometers under these conditions and that the Doppler resolution can also be quite high (depending on the duration of the chirp).

Although processes, equipment, and data structures are depicted in FIG. 2A and FIG. 2B as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

Figure 3A:
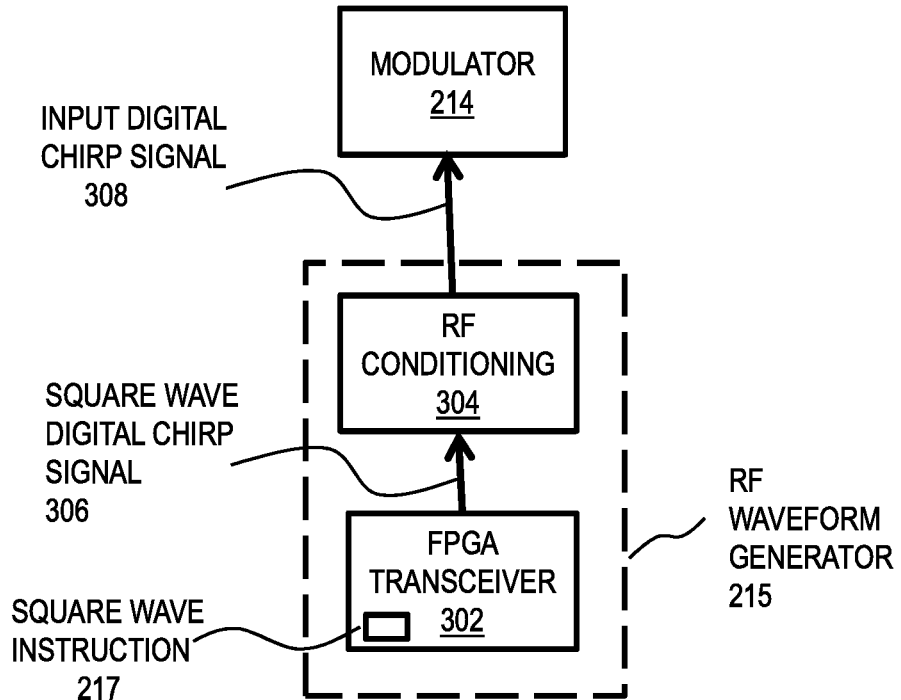
FIG. 3A is a block diagram that illustrates example components of the RF waveform generator of the LIDAR system of FIG. 2A, according to an embodiment.

FIG. 3A is a block diagram that illustrates example components of the RF waveform generator 215 of the LIDAR system 200 of FIG. 2A, according to an embodiment. In an embodiment, the RF waveform generator 215 includes a transceiver 302 to generate a square wave digital chirp signal 306. In some embodiments, the transceiver 302 is a transceiver of a Field Programmable Gate Array (FPGA). In an embodiment, the FPGA is used by the LIDAR system 200 to perform other functions and one or more otherwise unused transceivers 302 of the FPGA are accessed by the RF waveform generator 215. In one embodiment, the transceiver 302 of the FPGA has a bandwidth of about 32 GHz. For purposes of this description, the unit of Hertz (Hz) is used interchangeably with the unit of Samples per second (SPS) when discussing parameters of a digital signal. This embodiment advantageously employs an existing component of the LIDAR system 200 to generate a wideband digitized chirp signal to modulate an optical carrier in the LIDAR system 200. In an example embodiment, the FPGA is also used by the processing system 250 to calculate range to the target and/or to generate image data based on the calculated range.

In an embodiment, digital chirp waveforms are generated in software running on processor cores on the FPGA. In some embodiments on traditional FPGAs, these processors are soft-core processors implemented in the FPGA fabric. In other embodiments on System-on-Chip (SoC) FPGAs, there are hard-core processors implemented permanently in the silicon alongside the programmable logic fabric.

In an embodiment, a software algorithm takes several parameters as input, such as chirp repetition rate, chirp start frequency, chirp bandwidth, chirp direction, and output sample rate, and produces the chirp waveform data as output. The software-generated waveforms are loaded into dual-port block random-access memory (RAM) elements, implemented in the programmable logic fabric of the FPGA. One port of these RAM blocks is connected to the processor cores to enable this waveform load; the other port is connected to a finite state machine (FSM) in the programmable logic. This FSM is designed to read out the waveforms and feed them to the FPGA's multi-gigabit transceivers (MGTs) under the strict timing requirements necessary for seamless, repetitive chirp generation. The FSM is also itself controllable by the software running on the processor cores, enabling full waveform generation and control from the software environment.

The square wave waveform constitutes at least part of the instruction 217 that is uploaded to the FPGA transceiver 302 and is used as input to generate the square wave digital chirp signal 306. In some embodiments, the square wave instruction 217 is a bitstream that is parameterized based on one or more parameters of the square wave digital chirp signal 306. In an embodiment, the parameters include one or more of a start frequency, a stop frequency, a pulse duration and a pulse repetition frequency (PRF). In an example embodiment, the start frequency is about 500 MHz, the stop frequency is about 14 GHz, the pulse duration is about 100 microseconds (μsec) and the PRF is about 10 kilohertz (kHz). In some embodiments, the square wave instruction 217 includes a bit stream that indicates an output of a fixed amplitude over a first number of clock cycles (e.g. 111000) of the transceiver 302 to output a first frequency followed by an output of the fixed amplitude over a second number of clock cycles that is less than the first number of clock cycles (e.g. 1100) to output a second frequency that is greater than the first frequency. In other embodiments, the square wave instruction is included in the range determination module 270 and transmitted from the processing system 250 to the FPGA transceiver 302 rather than uploaded into the FPGA transceiver 302.

Figure 4A:
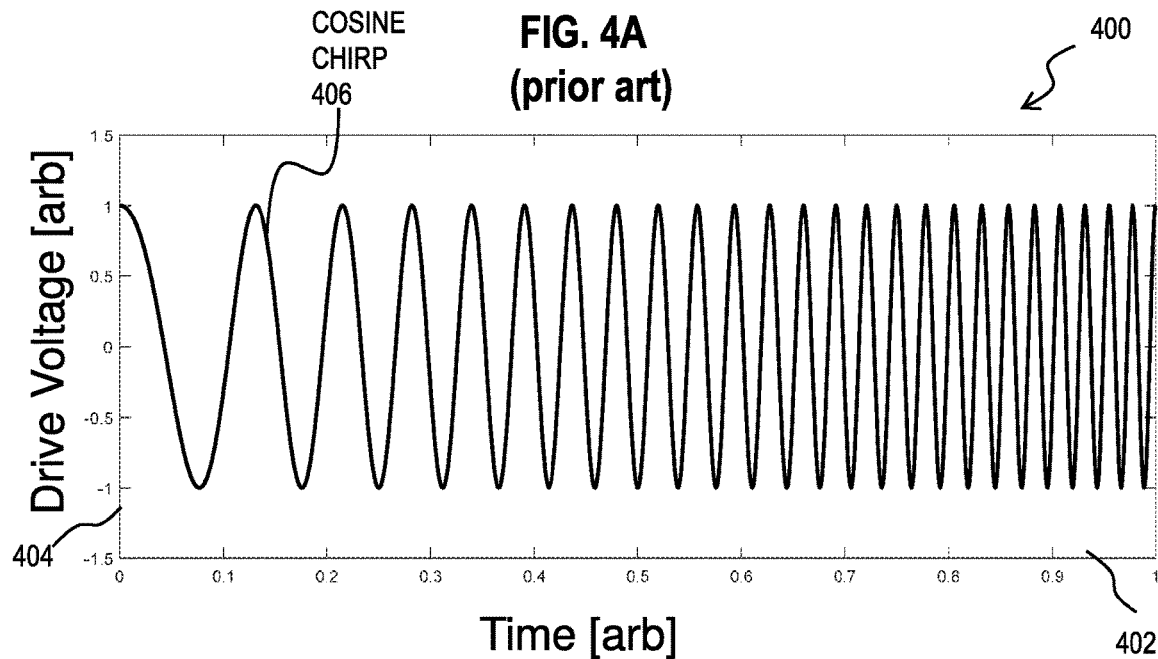
FIG. 4A is a graph that illustrates an example of an input digital chirp signal used in a conventional LIDAR system, according to an embodiment.

In some embodiments, the square wave instruction 217 is determined by digitizing a cosine chirp waveform (e.g. cosine chirp 406 signal in FIG. 4A). In an embodiment, the bitstream of the square wave instruction 217 at each clock cycle is determined based on an argument of the cosine chirp waveform at a time increment corresponding to each clock cycle. In one embodiment, the bitstream is set to 1 for those time increments where the argument of the cosine chirp waveform is on a right half of the unit circle. In this embodiment, the bitstream is set to 0 for those time increments where the argument of the cosine chirp waveform is on a left half of the unit circle. This advantageously avoids resource intensive steps, e.g. working with a look-up table or other method to compute the cosine function and thus provides an efficient method to compute the square wave instruction 217.

Figure 4B:
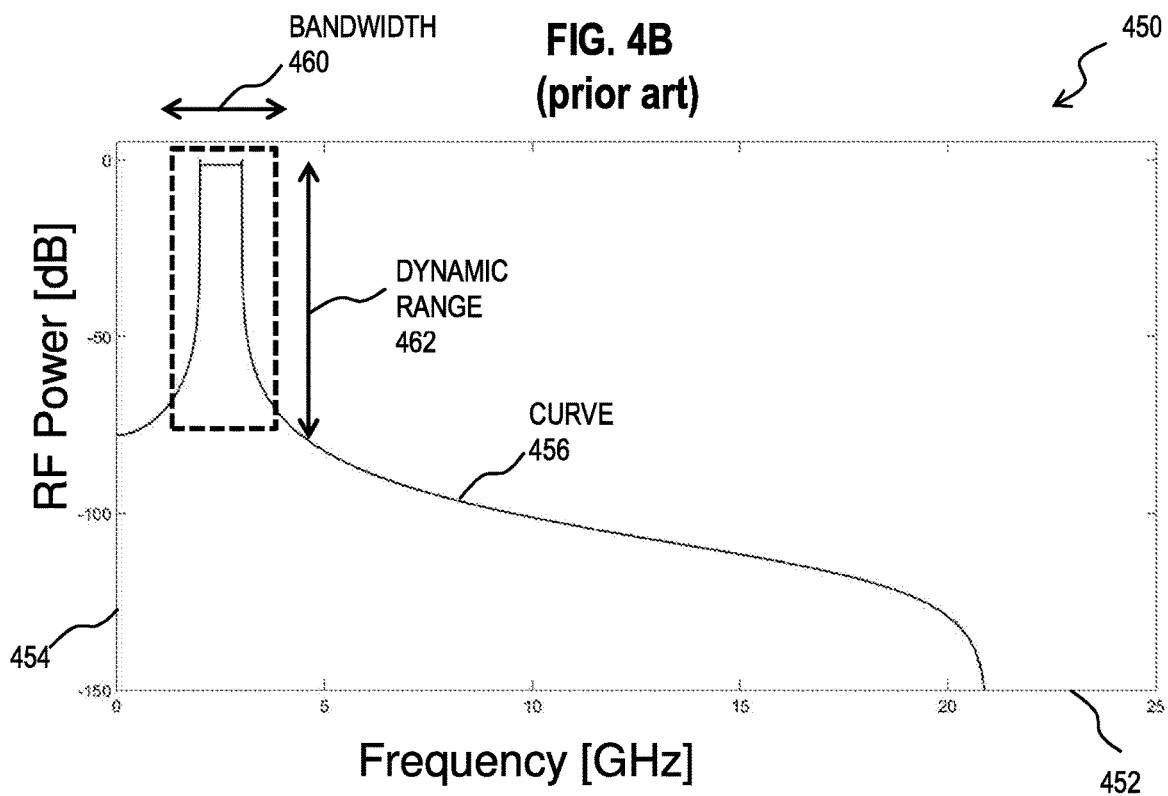
FIG. 4B is a graph that illustrates an example a frequency spectrum of the input digital chirp signal of FIG. 4A, according to an embodiment.

FIG. 4A is a graph 400 that illustrates an example of an input digital chirp signal used in a conventional LIDAR system, according to an embodiment. The horizontal axis 402 is time, measured in arbitrary units. The vertical axis 404 in voltage, measured in arbitrary units. In one embodiment, the input digital chirp signal is a cosine chirp 406 signal that linearly increases from a first frequency to a second frequency that is greater than the first frequency over time. FIG. 4B is a graph 450 that illustrates an example a frequency spectrum of the input digital chirp signal of FIG. 4A, according to an embodiment. The horizontal axis 452 is frequency in units of Gigahertz (GHz) and the vertical axis 454 is power in units of decibels (dB). In one embodiment, a curve 456 represents the frequency spectrum of the cosine chirp 406 signal. A bandwidth 460 of the frequency spectrum extends from the first frequency to the second frequency. In one embodiment, the bandwidth 460 is in a range from about 500 MHz to about 10 GHz. Additionally, a dynamic range 462 is defined as a difference between an amplitude of the curve 456 within the bandwidth 460 and an amplitude of the curve 456 outside the bandwidth 460. The dynamic range 462 is at least 50 dB.

FIG. 5A is a graph 500 that illustrates an example of the square wave digital chirp signal 306 used in the LIDAR systems 200, 280 of FIG. 2A and FIG. 2B, according to an embodiment. The horizontal axis 502 is time, measured in arbitrary units. The vertical axis 504 is voltage, measured in arbitrary units. In one embodiment, the square wave digital chirp signal 306 linearly increases from a first frequency to a second frequency greater than the first frequency over time. FIG. 5B is a graph 550 that illustrates an example of a frequency spectrum of the square wave digital chirp signal 306 of FIG. 5A, according to an embodiment. The horizontal axis 552 is frequency in units of Gigahertz (GHz) and the vertical axis 554 is power in units of decibels (dB).

In some embodiments, the RF waveform generator 215 of FIG. 3A includes RF conditioning 304 components that perform one or more conditioning steps to convert the square wave digital chirp signal 306 into the input digital chirp signal 308 of FIG. 3A that is input to the modulator 214. In some embodiments, the conditioning steps modify the frequency spectrum of the square wave digital chirp signal 306 of FIG. 5B so that the resulting frequency spectrum of the input digital chirp signal 308 shares one or more characteristics with the frequency spectrum of the input digital chirp signal in FIG. 4B. In one embodiment, the characteristics of the frequency spectrum of the input digital chirp signal in FIG. 4B include the bandwidth 460 and/or the dynamic range 462.

Figure 3B:
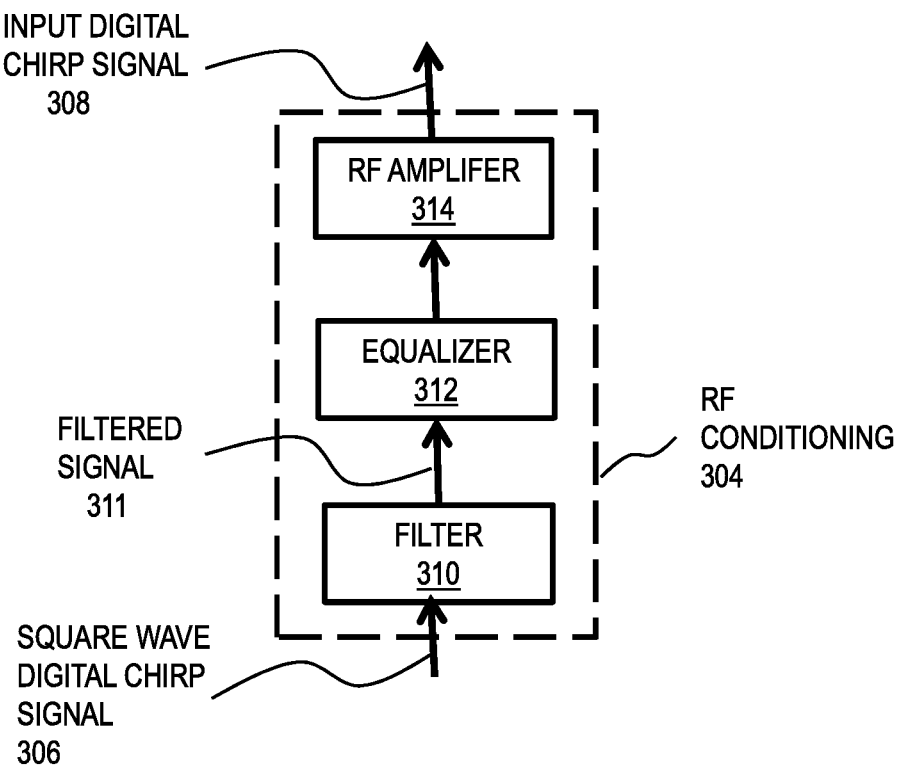
FIG. 3B is a block diagram that illustrates example components of RF conditioning of the RF waveform generator of FIG. 3A, according to an embodiment.

FIG. 3B is a block diagram that illustrates example components of RF conditioning 304 of the RF waveform generator 215 of FIG. 3A, according to an embodiment. In some embodiments, the RF conditioning 304 components include a filter 310 that is used to remove a range of frequencies from the frequency spectrum of the square wave digital chirp signal 306 of FIG. 5B. In one embodiment, the filter 310 is a band-pass filter that passes a range of frequencies that overlaps with the bandwidth 460 and removes a range of frequencies that falls outside the bandwidth 460 of the cosine chirp 406 signal in FIG. 4B. In some embodiments, higher order harmonics 555, 557 in the frequency spectrum of the square wave digital chirp signal 306 are removed by the filter 310. In this embodiment, the filter 310 removes a range of frequencies (e.g. above 5 GHz) from the frequency spectrum of the square wave digital chirp signal 306 of FIG. 5B. In an example embodiment, high order low-pass filters are used to significantly attenuate $3^{rd}$ order and higher harmonics. In some embodiments, the filtering advantageously converts the digital waveform into a sinusoidal waveform for use in the RF circuitry. In an example embodiment, the range of frequencies is removed such that the excluded range of frequencies encompasses the higher order harmonics 555, 557. As appreciated by one of ordinary skill in the art, the higher order harmonics 555, 557 are consequential frequency components of the square wave chirp 306 of FIG. 5A.

After using the filter 310 to remove the range of frequencies from the frequency spectrum, the resulting bandwidth 560 is the frequency spectrum of the input digital chirp signal 308. In some embodiments, the bandwidth 560 overlaps with the bandwidth 460 of the input digital chirp signal in FIG. 4B. In some embodiments, the bandwidth 560 of the input digital chirp signal 308 exceeds the bandwidth 460 of the input digital chirp signal. In various embodiments, the bandwidth 560 ranges from about 2 GHz to about 30 GHz. Preferably, the bandwidth 560 ranges from about 10 GHz to about 30 GHz. In one example embodiment, the bandwidth 560 ranges from about 2 GHz to about 3 GHz. In general, the bandwidth of the input digital chirp signal 308 extends from a first frequency to a second frequency. In an example embodiment, the first frequency is in a range from about 500 MHz to about 2 GHz and the second frequency is in a range from about 3 GHz to about 32 GHz. Although FIG. 5B depicts a bandwidth 560 in a range of 2-3 GHz, this is merely one example embodiment.

In other embodiments, the filter 310 removes the range of frequencies from the frequency power spectrum of the square wave digital chirp signal 306 in FIG. 5B, in order to establish a minimum dynamic range for the input digital chirp signal 308. The dynamic range is defined as a difference between an amplitude of the frequency power spectrum within the bandwidth 560 and an amplitude of the frequency power spectrum outside the bandwidth 560. As depicted in FIG. 5B, prior to removing the range of frequencies (e.g. harmonics 555, 557) with the filter 310, the dynamic range 563 is about 10 dB, e.g., difference between about 0 dB within the bandwidth 560 and about −10 dB at the higher order harmonic 555. After removing the range of frequencies (e.g. harmonics 555, 557) with the filter 310, the dynamic range 562 increased to about 20 dB, e.g., difference between about 0 dB within the bandwidth 560 and about −20 dB at a noise floor. In an embodiment, the minimum dynamic range of the input digital chirp signal 308 is in a range from about 20 dB to about 50 dB.

Although the amplitude of the frequency spectrum depicted in FIG. 5B is relatively flat over the bandwidth 560, in some embodiments the amplitude is uneven over the bandwidth 560. In one embodiment, the amplitude tapers off at higher frequencies such that the amplitude is larger at lower frequencies and smaller at higher frequencies within the bandwidth 560. It is advantageous for mixing if the frequency spectrum of the input digital chirp signal 308 has equal amplitude over the bandwidth 560.

Figure 6A:
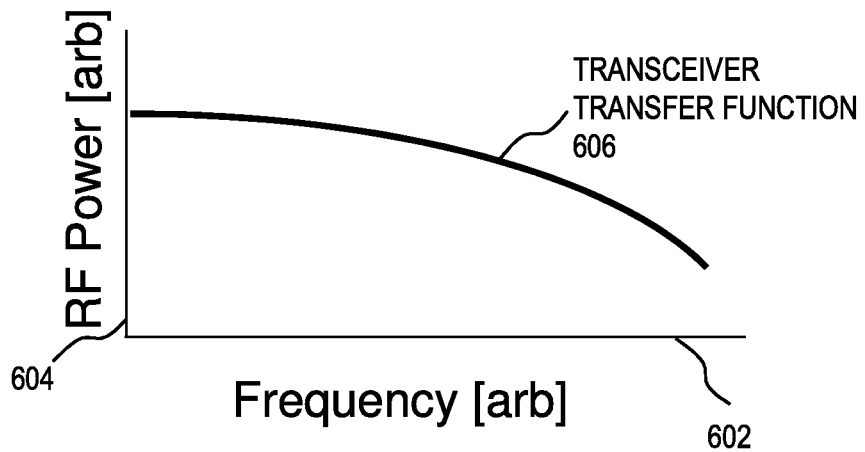
FIG. 6A is a graph that illustrates an example of a transfer function of the square wave digital chirp signal of the RF waveform generator of FIG. 3A, according to an embodiment.
Figure 6B:
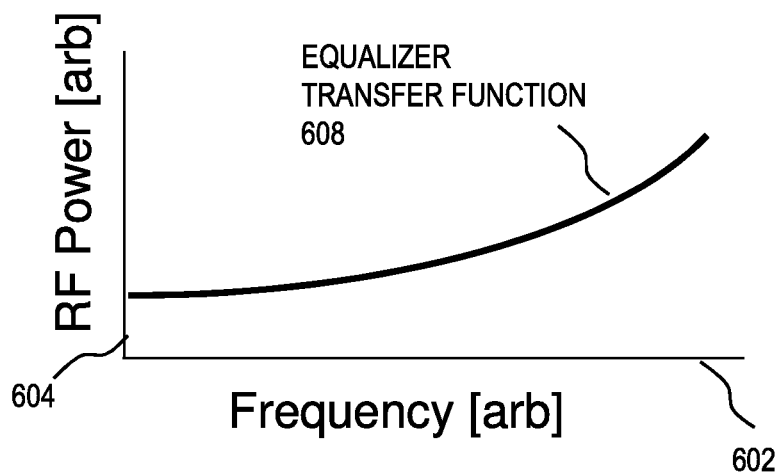
FIG. 6B is a graph that illustrates an example of a transfer function of the equalizer of the RF conditioning components of FIG. 3B, according to an embodiment.
Figure 6C:
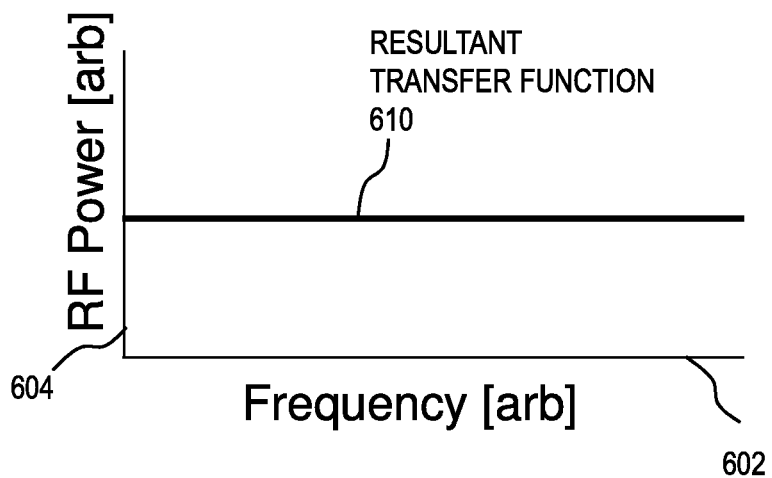
FIG. 6C is a graph that illustrates an example of a resultant function of the input digital chirp signal output from the RF waveform generator of FIG. 3A, according to an embodiment.

In some embodiments, the RF conditioning 304 components of FIG. 3B include an equalizer 312 that is used to flatten the amplitude of the frequency spectrum of the input digital chirp signal 308 over the bandwidth 560. FIG. 6A is a graph that illustrates an example of a transfer function 606 that depicts the amplitude of the frequency spectrum over the bandwidth 560. The horizontal axis 602 is frequency in arbitrary units and the vertical axis 604 is power in arbitrary units. After the filter 310 has removed the range of frequencies from the square wave digital chirp signal 306, a filtered signal 311 is received at the equalizer 312 with a frequency spectrum whose amplitude resembles the transfer function 606 over the bandwidth 560. In some embodiments, the transfer function 606 is a characteristic of the transceiver 302 and depicts the amplitude of the frequency spectrum of the square wave digital chirp signal over the bandwidth 560. FIG. 6B is a graph that illustrates an example of a transfer function 608 for an equalizer 312 of the RF conditioning components of FIG. 3B inserted to compensate for any disadvantageous shape of the transceiver and/or filtered transfer function 606, according to another embodiment. The horizontal axis 602 is frequency in arbitrary units and the vertical axis 604 is power in arbitrary units. In some embodiments, the equalizer 312 receives the filtered signal 311 from the filter 310 and magnifies the amplitude of the frequency spectrum of the filtered signal over the bandwidth 560 according to the transfer function 608. FIG. 6C is a graph that illustrates an example of a resultant function 610 of the input digital chirp signal 308 output from the RF waveform generator 215 of FIG. 3A, according to an embodiment. After the equalizer 312 magnifies the frequency spectrum of the filtered signal 311 over the bandwidth 560 using the transfer function 608, the resultant function 610 depicts the amplitude of the frequency spectrum of the input digital chirp signal 308 over the bandwidth 560. In some embodiments, the amplitude of the frequency spectrum is about equal over the bandwidth 560. In one example embodiment, the amplitude of the frequency spectrum is within about 10% flatness over the bandwidth 560. In another example embodiment, the amplitude of the frequency spectrum features a 3-6 dB variation over the bandwidth 560. In some embodiments, an RF amplifier 314 is provided to amplify the input digital chirp signal 308 before it is input to the modulator 214.

FIG. 3C is a block diagram that illustrates example components of the RF waveform generator 215 of the LIDAR system 280 of FIG. 2B, according to an embodiment. The RF waveform generator 215 of FIG. 3C is similar to the waveform generator 215 of FIG. 3A, with the exception that the FPGA transceiver 302 includes a plurality of channels (e.g. two channels) to generate a plurality of square wave digital chirp signals 306a, 306b. Additionally, the RF waveform generator 215 of FIG. 3C includes RF conditioning 304 components that perform one or more conditioning steps on each of the square wave digital chirp signals 306a, 306b to generate the input digital chirp signals 308a, 308b. In one embodiment, the first input digital chirp signal 308a is input to the modulator 214a to modulate a frequency of the transmit path beam 283 and the second input digital chirp signal 308b is input to the modulator 214b to modulate a phase of the reference path signal 287a. Modulation of the phase of the reference path signal 287a advantageously reduces noise at the detector array 230 resulting from intensity variations between the reference path signal 287b and returned light 291. In some embodiments, the square wave digital chirp signal 306a, 306b are independent such that they feature one or more distinct parameters (e.g. start frequency, stop frequency, pulse duration, pulse repetition frequency). In an embodiment, the square wave instruction 207 uploaded into the FPGA transceiver 302 of FIG. 3C includes distinct instructions for each square wave digital chirp signal 306a, 306b.

FIG. 7 is a graph that illustrates an example measurement of a beat frequency resulting from de-chirping in a conventional LIDAR system using the input digital chirp signal 406 of FIG. 4A, according to an embodiment. The horizontal axis 702 is frequency in units of MHz. The vertical axis 704 indicates returned signal power density $I_R$ relative to transmitted power density $I_T$ in decibels (dB, Power in dB=20 $\log(I_R/I_T)$). A curve 706 depicts an amplitude of the power spectrum over the beat frequency. A plurality of range return peaks 708a, 708b, 708c are depicted, where each range return peak indicates a respective range measurement, e.g., to different portions of an object or different objects. In an embodiment, the horizontal location of each peak 708a, 708b, 708c gives a distinct value of $f_R$ that is used with equation (1b) to calculate the respective range. A dynamic range 712 is measured between an amplitude of the curve 706 at a return peak 708 (e.g. −40 dB) and an amplitude of the curve 706 at a noise floor (e.g. −80 dB). In one embodiment, the dynamic range 712 is about 40 dB. In some embodiments, a minimum dynamic range of between about 20 dB to about 40 dB ensures accurate range detection.

FIG. 8 is a graph that illustrates an example measurement of a beat frequency resulting from de-chirping in a LIDAR system 200 using the square wave digital chirp signal 306 of FIG. 5A, according to an embodiment. The horizontal axis 802 is frequency in units of MHz. The vertical axis 804 indicates returned signal power density $I_R$ relative to transmitted power density $I_T$ in decibels (dB, Power in dB=20 log($I_R/I_T$)). A curve 806 depicts an amplitude of the power frequency spectrum over the beat frequency. A plurality of range return peaks 808a, 808b, 808c are depicted, where each range return peak indicates a respective range measurement, e.g., to different portions of an object or different objects. The horizontal location of each peak 808a, 808b, 808c gives a distinct value of $f_R$ that is used by the range determination module 270 with equation (1b) to calculate the respective range. Additionally, a plurality of spurious peaks 810a, 810b are depicted, which are obtained if the square wave digital chirp signal 306 is input to the modulator 214, e.g., in absence of RF conditioning 304. The spurious peaks 810a, 810b do not have corresponding peaks in FIG. 7 and thus would result in erroneous range calculations unless RF conditioning 304 is performed on the square wave digital chirp signal 306. The RF conditioning 304 advantageously removes the spurious peaks 810a, 810b from the beat frequency curve 806, thereby avoiding erroneous range calculations.

A dynamic range 812 is measured between an amplitude of the curve 806 at a return peak 808 (e.g. −35 dB) and an amplitude of the curve 806 at a noise floor (e.g. −80 dB). In one embodiment, the dynamic range 812 is about 35 dB which is greater than the minimum dynamic range (e.g. 20 dB) for accurate range detection. By removing the spurious peaks 810a, 810b, the RF conditioning also advantageously increased the dynamic range 812 above the minimum dynamic range for accurate range detection. In some embodiments, although the RF conditioning 304 reduces the amplitude of the return peaks 808, e.g., relative to the amplitude of return peaks 708, the dynamic range 812 exceeds the minimum dynamic range for accurate range detection.

FIG. 9 is a flow chart that illustrates an example method 900 for using a square wave digital chirp signal 306 for optical chirped range detection, according to an embodiment. Although the flow diagram of FIG. 9 is depicted as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 901, an optical signal is emitted from a laser source. In one embodiment, in step 901, the carrier wave 201 is emitted from the laser source 212 in the system 200 of FIG. 2A. In other embodiments, in step 901, the carrier wave 201 is emitted from the laser source 212 and a splitter 216 subsequently divides the carrier wave 201 into a transmit path beam 283 and a reference path signal 287a in the system 280 of FIG. 2B.

In step 903, a square wave digital chirp signal is generated with a transceiver. In one embodiment, in step 903, the square wave digital chirp signal 306 is generated within a transceiver 302 from a FPGA. In another embodiment, the square wave digital chirp signal 306 is generated by any high-speed serial transceiver on a chip. In an example embodiment, the square wave digital chirp signal 306 is generated by a digital signal processor (DSP). In one example embodiment, the DSP is implemented on an Application-specific integrated circuit (ASIC). In some embodiments, in step 903, the uploaded square wave instruction 207 in the FPGA transceiver 302 is executed to generate the square wave digital chirp signal 306. In other embodiments, in step 903, the square wave instruction is included in the range determination module 270 and communicated from the processing system 250 to the FPGA transceiver 302 to generate the square wave digital chirp signal 306. In other embodiments, other sources of digital signals are used.

In one embodiment, in step 903, a single square wave digital chirp signal 306 is generated within the transceiver 302 and is output from a single channel of the transceiver 302. In other embodiments, in step 903, a plurality of square wave digital chirp signals 306a, 306b are generated within the transceiver and are output from a plurality of channels of the transceiver 302.

In step 905, a frequency spectrum of the square wave digital chirp signal 306 generated in step 903 is determined. In one embodiment, the frequency spectrum of the square wave digital chirp signal 306 is depicted in FIG. 5B and includes high order harmonics 555, 557. In some embodiments, where the frequency spectrum of the square wave digital chirp signal 306 is predetermined, step 905 is omitted.

In step 907, a range of frequencies is removed from the frequency spectrum of the square wave digital chirp signal 306 determined in step 905. In some embodiments, in step 907, the range of frequencies is removed with a filter 310. In some embodiments, in step 907, the filter 310 is a band-pass filter that transmits a range of frequencies within the bandwidth 560 and removes one or more ranges of frequencies outside the bandwidth 560 of the frequency spectrum. In one embodiment, the bandwidth 560 is based on the bandwidth 460 of the frequency spectrum for the cosine chirp signal 406. In some embodiments, in step 907, the range of frequencies is removed with the filter 310 such that the bandwidth 560 overlaps with the bandwidth 460 and the bandwidth 560 is in a range from about 10 GHz to about 30 GHz. In other embodiments, in step 907, the range of frequencies is removed with the filter 310 such that the dynamic range 563 (e.g. 10 dB) is increased to the dynamic range 562 (e.g. 20 dB). In some embodiments, the increased dynamic range 562 exceeds a minimum dynamic range (e.g. 20 dB) for accurate range detection. In some embodiments, in step 907, the filter 310 removes the range of frequencies encompassing the higher order harmonics 555, 557. In an example embodiment, the filter 310 removes the range of frequencies above a threshold frequency (e.g. 5 GHz) to remove the higher order harmonics 555, 557. In some embodiments, where the frequency spectrum of the square wave digital chirp signal 306 is predetermined, step 905 is omitted and step 907 removes the range of frequencies based on the predetermined frequency spectrum. In some embodiments, in step 907, the filter 310 converts the square wave digital chirp signal 306 into the filtered signal 311 incident on the equalizer 312.

In step 909, an amplitude of the frequency spectrum from step 907 is equalized to generate the input digital chirp signal 308. In one embodiment, the amplitude of the frequency spectrum of the filtered signal 311 over the bandwidth 560 resembles the transfer function 606, e.g, tapers off at higher frequencies within the bandwidth 560. In one embodiment, in step 909, the equalizer 612 magnifies the amplitude of the frequency spectrum of the filtered signal 311 over the bandwidth 560 with the transfer function 608. The resulting amplitude of the frequency spectrum of the input digital chirp signal 308 over the bandwidth 560 resembles the resultant transfer function 610, e.g., approximately equal over the bandwidth 560. In some embodiments, the input digital chirp signal 308 is amplified by the RF amplifier 314 and is then input to the modulator 214.

In other embodiments, any digital to analog converter can be used in or in place of steps 903, 905, 907, 909 to generate the input digital chirp signal 308 based on the uploaded square wave instruction 207. As appreciated by one of skill in the art, selection of a digital to analog converter involves a tradeoff between bit-depth and bandwidth.

In step 911, a frequency of the optical signal in step 901 is modulated with a modulator based on the input digital chirp signal 308 from step 909. In one embodiment, in step 911, the frequency of the carrier wave 201 is modulated with the modulator 214 of FIG. 2A based on the input digital chirp signal 308 from the RF waveform generator 215, to produce a pulse that has a bandwidth B and a duration τ. In other embodiments, in step 911, where the carrier wave 201 is emitted from the laser source 212 and the splitter 216 of FIG. 2B subsequently divides the carrier wave 201 into the transmit path beam 283 and the reference path signal 287a, the frequency of the transmit path beam 283 is modulated with the modulator 214a based on the first input digital chirp signal 308a from the RF waveform generator 215.

In step 913, the optical signal of step 911 is divided into a transmit optical signal and a reference optical signal. In an embodiment, in step 913, the modulated beam 203 from the modulator 214 in FIG. 2A is divided with the splitter 216 into the transmit signal 205 and the reference signal 207a. In an embodiment, step 913 is omitted with respect to the embodiment of FIG. 2B, since the splitter 216 already divided the optical signal prior to the modulation in step 911.

In step 914, a phase of the reference path signal 287a is modulated with a modulator based on the input digital chirp signal from step 909. In one embodiment, in step 914, the phase of the reference path signal 287a is modulated with the modulator 214b of FIG. 2B based on the input digital chirp signal 308b from the RF waveform generator 215. In some embodiments, the input digital chirp signal 308b is distinct from the input digital chirp signal 308a incident on the modulator 214a in step 911 to modulate the frequency of the transmit path beam 283. In some embodiments, step 914 is omitted.

In step 915, the reference path optical signal and the returned signal 291 are combined at a detector. In one embodiment, in step 915, the reference path signal 207b and the returned signal 291 are combined at the detector array 230 in FIG. 2A. In another embodiment, in step 915, the reference path signal 287b and the returned signal 291 are combined at the detector array 230 in FIG. 2B.

In step 917, an electrical output signal is generated from the detector. In one embodiment, an electrical output signal is generated from the detector array 230 based on step 915. In an embodiment, the electrical output signal includes one or more beat frequencies based on a frequency difference between the reference signal and the returned signal.

In step 919, a range to an object is determined based on a characteristic of a Fourier transform of the electrical output signal in step 917. In one embodiment, based on the range determination module 270, the processing system 250 performs the Fourier transform of the electrical output signal received from the detector array 230 to obtain a frequency spectrum of the electrical output signal (e.g. curve 806 in FIG. 8). Additionally, the processing system 250 identifies one or more range return peaks 808a, 808b, 808c in the frequency spectrum of the electrical output signal. The processing system 250 further determines one or more characteristics (e.g. frequency value or $f_R$) of the peaks and zero or more Doppler shifts. The processing system 250 then calculates a range for each peak based on the detected frequency and or a Doppler corrected frequency and equation (1b).

3. Computational Hardware Overview

Figure 10:
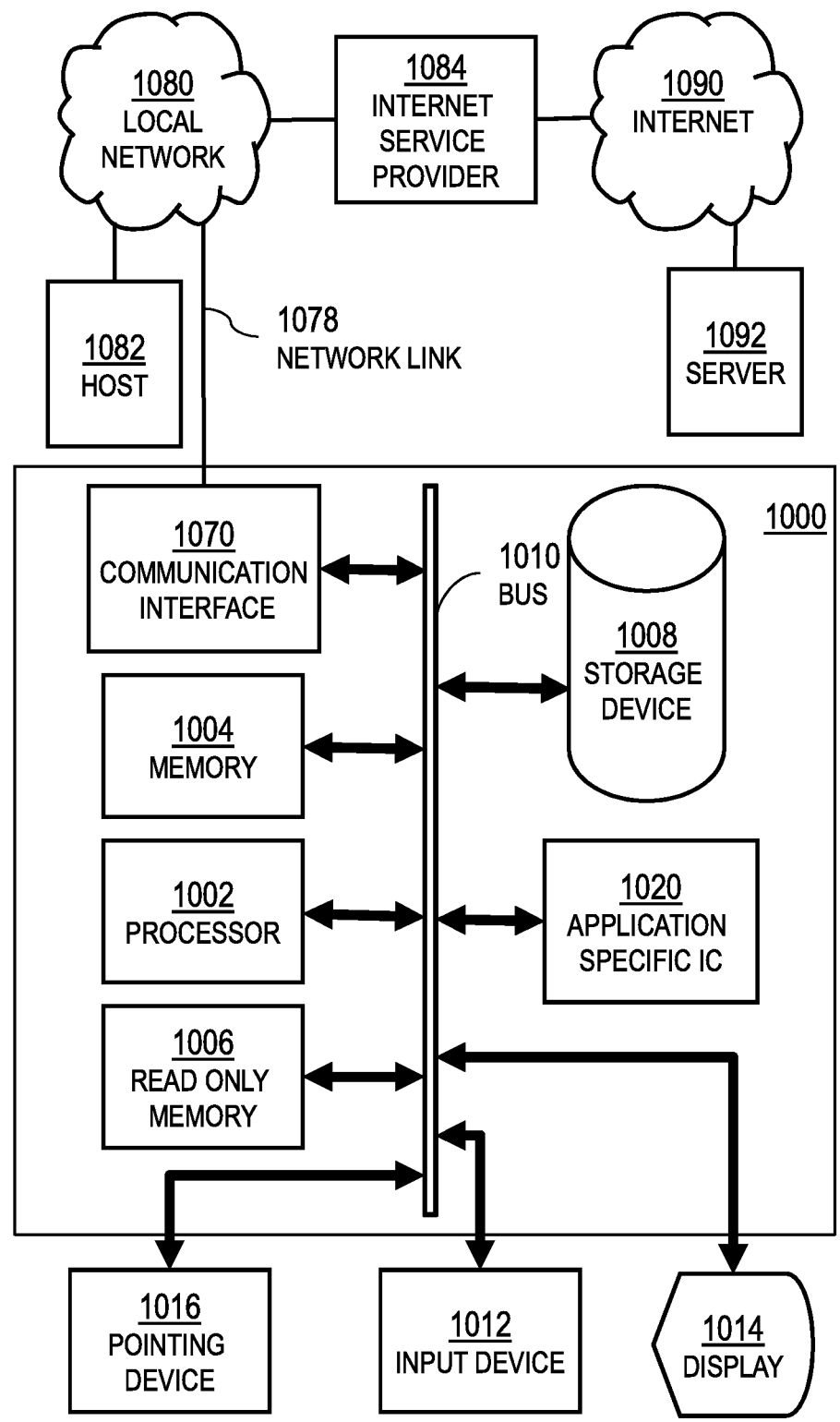
FIG. 10 is a block diagram that illustrates a computer system upon which an embodiment of the invention may be implemented.

FIG. 10 is a block diagram that illustrates a computer system 1000 upon which an embodiment of the invention may be implemented. Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of one or more methods described herein.

A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

Information, including instructions, is provided to the bus 1010 for use by the processor from an external input device 1012, such as a keyboard containing alphanumeric keys operated by a human user, or a sensor. A sensor detects conditions in its vicinity and transforms those detections into signals compatible with the signals used to represent information in computer system 1000. Other external devices coupled to bus 1010, used primarily for interacting with humans, include a display device 1014, such as a cathode ray tube (CRT) or a liquid crystal display (LCD), for presenting images, and a pointing device 1016, such as a mouse or a trackball or cursor direction keys, for controlling a position of a small cursor image presented on the display 1014 and issuing commands associated with graphical elements presented on the display 1014.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1070 sends and receives electrical, acoustic or electromagnetic signals, including infrared and optical signals, that carry information streams, such as digital data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1002, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1002, except for carrier waves and other signals.

Logic encoded in one or more tangible media includes one or both of processor instructions on a computer-readable storage media and special purpose hardware, such as ASIC 1020.

Network link 1078 typically provides information communication through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides information representing video data for presentation at display 1014.

The invention is related to the use of computer system 1000 for implementing the techniques described herein. According to one embodiment of the invention, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020, may be used in place of or in combination with software to implement the invention. Thus, embodiments of the invention are not limited to any specific combination of hardware and software.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server 1092 transmits program code for a particular application, requested by a message sent from computer 1000, through Internet 1090, ISP equipment 1084, local network 1080 and communications interface 1070. The received code may be executed by processor 1002 as it is received, or may be stored in storage device 1008 or other non-volatile storage for later execution, or both. In this manner, computer system 1000 may obtain application program code in the form of a signal on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red a carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
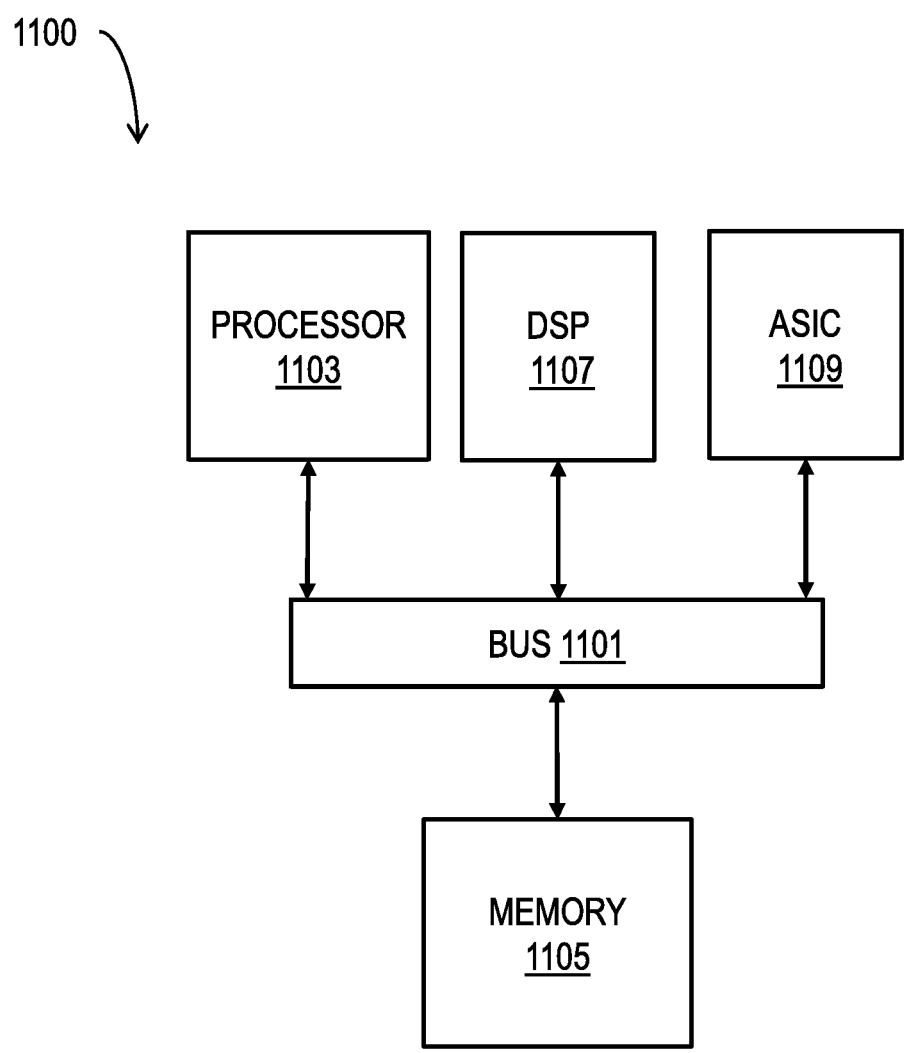
FIG. 11 illustrates a chip set upon which an embodiment of the invention may be implemented.

FIG. 11 illustrates a chip set 1100 upon which an embodiment of the invention may be implemented. Chip set 1100 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

4. Alterations, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

5. References

Adany, P., C. Allen, and R. Hui, "Chirped Lidar Using Simplified Homodyne Detection," Jour. Lightwave Tech., v. 27 (16), 15 Aug. 2009.
Hui, R., C. Allen, and P. Adany, "Coherent detection scheme for FM Chirped laser RADAR," U.S. Pat. No. 7,742,152, 22 Jun. 2010.
Kachelmyer, A. L., "Range-Doppler Imaging with a Laser Radar," The Lincoln Laboratory Journal, v. 3. (1), 1990.

What is claimed is:

1. A light detection and ranging (LIDAR) system, comprising:
   a radio frequency (RF) waveform generator configured to generate an input digital chirp signal using a square wave digital chirp signal;
   a modulator configured to modulate a frequency of an optical signal using the input digital chirp signal;
   one or more scanning optics configured to generate a transmit optical signal using the modulated optical signal and transmit the transmit optical signal;

a detector configured to receive a return optical signal responsive to the transmit optical signal; and a processor configured to determine a range to an object using the return optical signal and a reference optical signal.

2. The LIDAR system of claim 1, further comprising a reference path configured to delay the reference optical signal so that the reference optical signal arrives at the detector with the return optical signal.

3. The LIDAR system of claim 1, wherein the reference optical signal is generated by being split from the optical signal, generated by being split from the modulated optical signal, or generated by a second laser source separate from a first laser source that generates the optical signal.

4. The LIDAR system of claim 1, wherein the square wave digital chirp signal linearly increases from a first frequency to a second frequency.

5. The LIDAR system of claim 1, wherein the RF waveform generator comprises a filter configured to remove a frequency range of frequencies from the square wave digital chirp signal to increase a dynamic range of the input digital chirp signal to be from about 20 dB to about 50 dB.

6. The LIDAR system of claim 1, wherein a bandwidth of the input digital chirp signal is from about 10 GHz to about 30 GHz.

7. The LIDAR system of claim 1, wherein the detector comprises at least one of a single optical detector, a balanced pair of optical detectors, a one-dimensional array of optical detectors, or a two-dimensional array of optical detectors.

8. The LIDAR system of claim 1, wherein the processor is configured to use the range to the object to perform collision avoidance.

9. The LIDAR system of claim 1, further comprising:
a splitter configured to:
divide the optical signal into the transmit optical signal and the reference optical signal;
provide the transmit optical signal to the one or more scanning optics; and
provide the reference optical signal to the detector, wherein the detector is configured to generate an electrical output signal using the reference optical signal and the return optical signal, and the processor is configured to determine the range to the object using the electrical output signal.

10. The LIDAR system of claim 9, wherein the processor is configured to determine the range to the object by performing a Fourier transform using the electrical output signal.

11. A method, comprising:
generating an input digital chirp signal using a square wave digital chirp signal;
modulating a frequency of an optical signal using the input digital chirp signal;
transmitting a transmit optical signal using the modulated optical signal;
receiving a return optical signal responsive to the transmit optical signal; and determining a range to an object using the return optical signal and a reference optical signal.

12. The method of claim 11, further comprising delaying the reference optical signal along a reference path so that the reference optical signal arrives at a detector with the return optical signal.

13. The method of claim 11, wherein the square wave digital chirp signal linearly increases from a first frequency to a second frequency.

14. The method of claim 11, further comprising removing a frequency range of frequencies from the square wave digital chirp signal to increase a dynamic range of the input digital chirp signal to be from about 20 dB to about 50 dB.

15. The method of claim 11, wherein a bandwidth of the input digital chirp signal is in from about 10 GHz to about 30 GHz.

16. The method of claim 11, wherein receiving the return optical signal comprises receiving the return optical signal using at least one of a single optical detector, a balanced pair of optical detectors, a one-dimensional array of optical detectors, or a two-dimensional array of optical detectors.

17. The method of claim 11, further comprising:
dividing the optical signal into the transmit optical signal and the reference optical signal;
generating an electrical output signal using the reference optical signal and the return optical signal; and
determining the range to the object using the electrical output signal.

18. A non-transitory computer-readable medium comprising processor-executable instructions that when executed by one or more processors, cause the one or more processors to:
generate an input digital chirp signal using a square wave digital chirp signal;
modulate a frequency of an optical signal using the input digital chirp signal to generate a modulated optical signal;
generate a reference optical signal using at least one of the optical signal or the modulated optical signal;
transmit a transmit optical signal using the modulated optical signal;
receive a return optical signal responsive to the transmit optical signal; and
determine a range to an object using the return optical signal and the reference optical signal.

19. The non-transitory computer-readable medium of claim 18, further comprising instructions configured to cause the one or more processors to delay the reference optical signal along a reference path so that the reference optical signal arrives at a detector with the return optical signal.

20. The non-transitory computer-readable medium of claim 18, further comprising instructions configured to cause the one or more processors to remove a frequency range of frequencies from the square wave digital chirp signal to increase a dynamic range of the input digital chirp signal to be from about 20 dB to about 50 dB.

* * * * *